US010074186B2

(12) United States Patent
Nukaga et al.

(10) Patent No.: US 10,074,186 B2
(45) Date of Patent: Sep. 11, 2018

(54) IMAGE SEARCH SYSTEM, IMAGE SEARCH APPARATUS, AND IMAGE SEARCH METHOD

(71) Applicant: Hitachi, Ltd., Tokyo (JP)

(72) Inventors: Nobuo Nukaga, Tokyo (JP); Daisuke Matsubara, Tokyo (JP); Yuki Watanabe, Tokyo (JP); Kenichi Yoneji, Tokyo (JP); Tomoaki Yoshinaga, Tokyo (JP); Atsushi Hiroike, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 90 days.

(21) Appl. No.: 15/114,585

(22) PCT Filed: Jan. 14, 2015

(86) PCT No.: PCT/JP2015/050786
§ 371 (c)(1),
(2) Date: Jul. 27, 2016

(87) PCT Pub. No.: WO2015/115179
PCT Pub. Date: Aug. 6, 2015

(65) Prior Publication Data
US 2016/0343147 A1    Nov. 24, 2016

(30) Foreign Application Priority Data
Jan. 31, 2014    (JP) ................. 2014-016813

(51) Int. Cl.
G06F 17/30    (2006.01)
G06T 7/20    (2017.01)
(Continued)

(52) U.S. Cl.
CPC ............ G06T 7/2033 (2013.01); G06F 3/048 (2013.01); G06F 17/30 (2013.01);
(Continued)

(58) Field of Classification Search
None
See application file for complete search history.

(56) References Cited

U.S. PATENT DOCUMENTS 6,593,926 B1    7/2003    Yamaguchi et al.
2002/0114394 A1*    8/2002    Ma ........................ H04N 19/51
                                                           375/240.16
(Continued)

FOREIGN PATENT DOCUMENTS

JP    2004-118290 A    4/2004
JP    2013-150218 A    8/2013

OTHER PUBLICATIONS

Singaporean Written Opinion received in corresponding Singaporean Application No. 11201606262T dated Oct. 4, 2016.
(Continued)

Primary Examiner — Eileen M Adams
(74) Attorney, Agent, or Firm — Mattingly & Malur, PC

(57) ABSTRACT

An image search system comprising an video taking unit that takes a video, a search unit that contains a processor and a storage unit and searches for an image contained in the video, an input unit that receives information that is input to the search unit, and a display unit that displays information that is output from the search unit. The storage unit holds information indicating the shapes of trajectories that represent the travel paths of a plurality of moving objects extracted from the video. When information indicating the shape of a trajectory is input from the input unit, the search unit searches the plurality of moving-object trajectories held in the storage unit for trajectories that are similar to the input trajectory shape, and if such a trajectory is found, the search unit displays, on the display unit, images of the moving objects that have traveled along the found trajectories.

12 Claims, 14 Drawing Sheets

(51) Int. Cl.
    *G06F 3/048*    (2013.01)
    *G06K 9/46*     (2006.01)
    *G06K 9/62*     (2006.01)
    *G06T 1/00*     (2006.01)
    *G06T 7/246*    (2017.01)

(52) U.S. Cl.
    CPC .. *G06F 17/30784* (2013.01); *G06F 17/30823* (2013.01); *G06K 9/4671* (2013.01); *G06K 9/6201* (2013.01); *G06T 1/0007* (2013.01); *G06T 7/246* (2017.01)

(56) References Cited

U.S. PATENT DOCUMENTS

2010/0238285 A1* 9/2010 Desimone .......... G06K 9/00335
                                                            348/143
2012/0029813 A1* 2/2012 Tajima ................. G08G 1/161
                                                            701/300
2014/0205148 A1   7/2014 Hirano et al.

OTHER PUBLICATIONS

Yajima, C. et al. "Querying Video Data by Spatio-Temporal Relationships of Moving Object Traces", Visual and Multimedia Information Management, 2002, pp. 357-371, vol. 88.
Chikashi Yajima et al.; "Querying Soccer Video Data by Directly Drawing the Movement on the Video Screen", IPSJ SIG Technical Report, May 21, 2002, pp. 33-40, vol. 2002, No. 41.
Jun Ishizuka et al.,"A Similarity Search of Trajectory Data for Supporting Kyoto Sightseeing", IPSJ SIG Technical Report, Jan. 11, 2007, pp. 17-23, vol. 2007, No. 1.
International Search Report of PCT/JP2015/050786 dated Apr. 7, 2015.

* cited by examiner

VIDEO DATABASE STRUCTURES 111
(CONTINUED FROM PRECEDING SHEET)

830

| 831 FACE ID | 832 FRAME ID | 833 COORDINATES OF RECTANGULAR AREA | 834 FACIAL FEATURE AMOUNT |
|---|---|---|---|
| 1 | 1 | [126, 25, 157, 54] | [178, 92, 14, 23, 39,...] |
| 2 | 1 | [16, 335, 46, 382] | [39, 214, 86, 57, 29,...] |
| 3 | 2 | [326, 5, 354, 42] | [46, 141, 91, 85, 174,...] |
| ... | ... | ... | ... |

840

| 841 HEAD ID | 842 FRAME ID | 843 COORDINATES OF RECTANGULAR AREA | 844 HEAD FEATURE AMOUNT |
|---|---|---|---|
| 1 | 1 | [126, 15, 167, 64] | [178, 92, 14, 23, 39,...] |
| 2 | 1 | [16, 325, 56, 392] | [39, 214, 86, 57, 29,...] |
| 3 | 2 | [326, 2, 364, 52] | [46, 141, 91, 85, 174,...] |
| ... | ... | ... | ... |

850

| 851 CLOTHING ID | 852 FRAME ID | 853 COORDINATES OF RECTANGULAR AREA | 854 CLOTHING FEATURE AMOUNT |
|---|---|---|---|
| 1 | 1 | [126, 15, 137, 24] | [178, 92, 14, 23, 39,...] |
| 2 | 1 | [16, 325, 26, 335] | [39, 214, 86, 57, 29,...] |
| 3 | 2 | [326, 2, 334, 12] | [46, 141, 91, 85, 174,...] |
| ... | ... | ... | ... |

*FIG. 8B*

IMAGE SEARCH SYSTEM, IMAGE SEARCH APPARATUS, AND IMAGE SEARCH METHOD

CLAIM OF PRIORITY

The present application claims priority from Japanese patent application JP2014-16813 filed on Jan. 31, 2014, the content of which is hereby incorporated by reference into this application.

BACKGROUND OF THE INVENTION

This invention relates to an image search technology.

The background art of the technical field of this invention includes JP 2013-150218 A. In JP 2013-150218 A, there is disclosed a "moving image search apparatus in which a reception module is configured to receive an input of a still image, an input of two reference points within the still image, and an input of two objective points within a moving image frame. An extraction module is configured to extract a reference image, which includes the two reference points, from the still image. A search module is configured to: search frame images included in a moving image for a similar frame image in which a local image resembling the reference image is drawn; track two movement trajectories that two focus pixels form when time is moved forward or backward from the similar frame image in the moving image, the focus pixels being drawn at start points in the local image that correspond to the two reference points; search for an objective frame image in which the two movement trajectories come close to the two objective points; and present, as a search result, a moving image that includes the similar frame image and the objective frame image".

SUMMARY OF THE INVENTION

When taken videos are searched for an image of a moving object, for example, a suspicious person or a suspicious vehicle, there are cases where, although information that characterizes the moving object, for example, information about the traveling path, exterior features, or the like of the moving object, is obtained, an image that actually captures the moving object is not identified. There has been no way to search for an image of the moving object based on features of the moving object that are input by a user in such cases.

In order to solve the foregoing problem, one mode of this invention is an image search system, comprising: a video taking unit configured to take a video; a search unit comprising a storage unit and configured to search for an image that is contained in the video; an input unit configured to receive information that is input to the search unit; and a display unit configured to display information that is output from the search unit, wherein the storage unit is configured to hold information indicating shapes of trajectories that represent travel paths of a plurality of moving objects extracted from the video, and wherein the search unit is configured to: search, when information indicating a trajectory shape is input from the input unit, the trajectories of the plurality of moving objects that are held in the storage unit for trajectories that are similar to the input trajectory shape; and display, on the display unit, images of the moving objects that have traveled along the trajectories found through the search.

According to the one mode of this invention, a search for the trajectory of a moving object similar to a trajectory specified by a user can be conducted irrespective of whether or not there is a video that actually captures the moving object that is the target of the search. Other objects, configurations, and effects than those described above are disclosed through the following description of embodiments of this invention.

BRIEF DESCRIPTION OF THE DRAWINGS

FIG. 8A and FIG. 8B are explanatory diagrams for illustrating the configuration and data example of a video database according to the second embodiment of this invention.

DETAILED DESCRIPTION OF THE PREFERRED EMBODIMENTS

Embodiments of this invention are described with reference to the drawings.

First Embodiment

Figure 1:
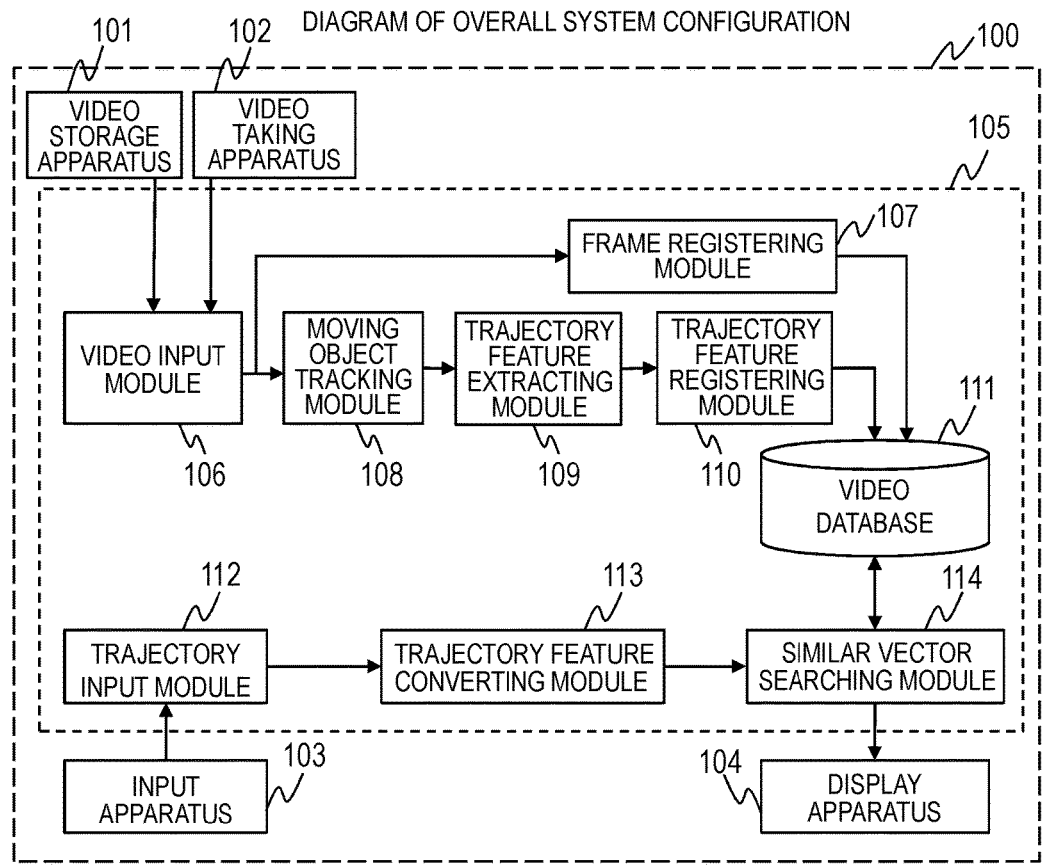
FIG. 1 is a diagram for illustrating the overall configuration of an image search system according to a first embodiment of this invention.

FIG. 1 is a diagram for illustrating the overall configuration of an image search system 100 according to a first embodiment of this invention.

The image search system 100 of this embodiment includes a video storage apparatus 101, a video taking apparatus 102, an input apparatus 103, a display apparatus 104, and a server computer 105.

The video storage apparatus 101 is a recording medium on which video data is saved and from which video data is output in response to a request. The video storage apparatus 101 can be a hard disk drive built in the computer, or a storage system coupled to the computer via a network, e.g., network attached storage (NAS) or a storage area network (SAN).

The video taking apparatus is configured to create video data by taking a video, and to output the video data.

An image output from the video storage apparatus 101 and an image output from the video taking apparatus 102 are input to a video input module 106 (described later) of the server computer 105. The image search system 100 may include both of the video storage apparatus 101 and the video taking apparatus 102 as illustrated in FIG. 1, or may include only one of the two. When the image search system 100 include the video storage apparatus 101 and the video taking apparatus 102 both, the source from which video data is input to the video input module 106 may be switched between the video storage apparatus 101 and the video taking apparatus 102 as needed, or video data output from the video taking apparatus 102 may be stored temporarily on the video storage apparatus 101 to be input to the video input module 106 from the video storage apparatus 101. In the latter case, the video storage apparatus 101 can be, for example, a cache memory configured to temporarily hold pieces of video data that are constantly input from the video taking apparatus 102.

Video data saved on the video storage apparatus 101 and video data created by the video taking apparatus 102 can be in any format as long as the data can be used to track a taken object. For example, the video taking apparatus 102 may be a video camera, and data of a moving image taken with the video camera may be output as video data or may be stored on the video storage apparatus 101 as video data. The video taking apparatus 102 may instead be a still camera, and pieces of data of a series of still images taken with the still camera at given intervals (intervals that are at least short enough to be able to track a taken object) may be output as video data or may be stored on the video storage apparatus 101 as video data.

The input apparatus 103 is an input interface configured to transmit a user's operation to the server computer 105, for example, one or more apparatus selected from a group that includes a mouse, a keyboard, and a touch device. The display apparatus 104 is a liquid crystal display or other output interfaces, and is used to display search results of the server computer 105, to enable the user to perform interactive operation, and the like. The input apparatus 103 and the display apparatus 104 may be integrated into one by using, for example, a touch panel.

The server computer 105 functions as an image search apparatus configured to search input video data for a desired image based on search terms that are specified by the user. Specifically, the server computer 105 tracks a moving object that is included in each frame of input video data, and accumulates information about the moving object. When the user specifies a search term about a moving object to be searched for among the accumulated frames, the server computer 105 uses the accumulated information to conduct a search on images. It is assumed here that videos handled by the server computer 105 are fixed-point observation videos taken in at least one place. An object to be searched for is an arbitrary moving object, e.g., a person or a vehicle. The server computer 105 includes the video input module 106, a frame registering module 107, a moving object tracking module 108, a trajectory feature extracting module 109, a trajectory feature registering module 110, a video database 111, a trajectory input module 112, a trajectory feature converting module 113, and a similar vector searching module 114.

The video input module 106 is configured to receive video data that is read out of the video storage apparatus 101 or video data that is taken by the video taking apparatus 102, and to convert the received video data into a data format that is used inside the server computer 105. Specifically, the video input module 106 executes moving image decoding processing in which a video is broken into frames (a moving image data format is turned into a still image data format). The obtained frames are sent to the frame registering module 107 and the moving object tracking module 108.

The frame registering module 107 is configured to write, in the video database 111, extracted frames and information about a video from which the frames are extracted. Details of data recorded in the video database 111 are described later in a description of FIG. 3.

The moving object tracking module 108 is configured to track a moving object by detecting the moving object in a video and associating the moving object in one frame with the moving object in the preceding frame. Any method can be used to accomplish the detection and tracking of a moving object. The trajectory of a moving object the traveling path of the moving object) that is obtained by the tracking is expressed in the form of a vector that has a starting point and an end point, and trajectory information includes coordinate information of the moving object in each frame and an ID assigned uniquely to each trajectory (a tracking ID).

The trajectory feature extracting module 109 is configured to extract the feature amount of a trajectory shape (hereinafter also referred to as "trajectory feature amount") from the coordinates of a moving object to which the same tracking ID is assigned. The trajectory feature registering module 110 is configured to register the extracted trajectory feature amount in the video database 111.

The video database 111 is configured to save, among others, videos, frames, and trajectory information of a moving object. The trajectory information includes the trajectory feature amount as described later, thereby enabling the server computer 105 to search for an image of a moving object that has a trajectory feature amount similar to an input trajectory feature amount. The trajectory feature amount search function is a function of outputting data after sorting the data in the order of closeness to a trajectory feature amount input as, for example, a query. The Euclidean distance between trajectory feature amount vectors, for example, can be used in the comparison between trajectory feature amounts. The video database 111 is accessed during registration processing conducted by the frame registering module 107, registration processing conducted by the trajectory feature registering module 110, and search processing conducted by the similar vector searching module 114. Details of the structures of the video database 111 are described later in the description of FIG. 3.

The trajectory input module 112 is configured to receive, from the input apparatus 103, information about a trajectory (e.g., a string of coordinate values) that is input by the user. The trajectory feature converting module 113 is configured to obtain a trajectory feature amount that is input. The similar vector searching module 114 is configured to search the video database 111 for a trajectory feature amount similar to an input trajectory feature amount, and to output the result of the search to the display apparatus 104.

Figure 2:
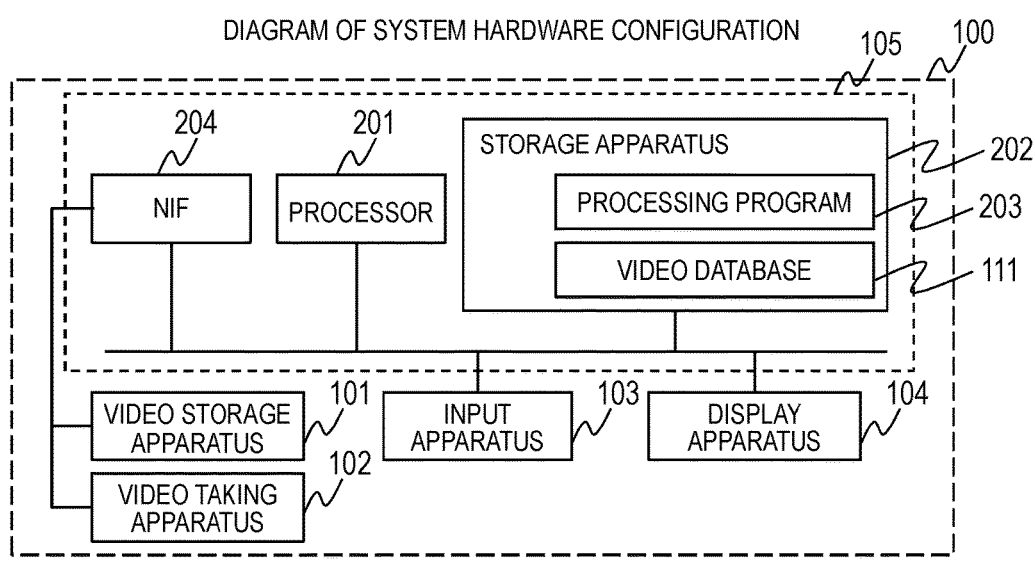
FIG. 2 is a diagram for illustrating the hardware configuration of the image search system according to the first embodiment of this invention.

FIG. 2 is a diagram for illustrating the hardware configuration of the image search system 100 according to the first embodiment of this invention.

The server computer 105 is a general computer that includes, for example, a processor 201 and a storage apparatus 202 coupled to each other. The storage apparatus 202 can include a storage medium of any type. For example, the storage apparatus 202 may include a semiconductor memory and a hard disk drive.

In this example, the function modules illustrated in FIG. 1 such as the video input module 106, the frame registering module 107, the moving object tracking module 108, the trajectory feature extracting module 109, the trajectory feature registering module 110, the trajectory input module 112, the trajectory feature converting module 113, and the similar vector searching module 114 are implemented by the processor 201 by executing a processing program 203, which is stored in the storage apparatus 202. In other words, processing executed by the function modules in this example is actually executed by the processor 201, which follows commands written in the processing program 203. The video database 111 is included in the storage apparatus 202.

The server computer 105 further includes a network interface apparatus (NIF) 204 coupled to the processor. The video taking apparatus 102 is coupled to the server computer 105 via the network interface apparatus 204, for example. The video storage apparatus 101 may be a NAS or an SAN that is coupled to the server computer 105 via the network interface apparatus 204, or may be included in the storage apparatus 202.

Figure 3:
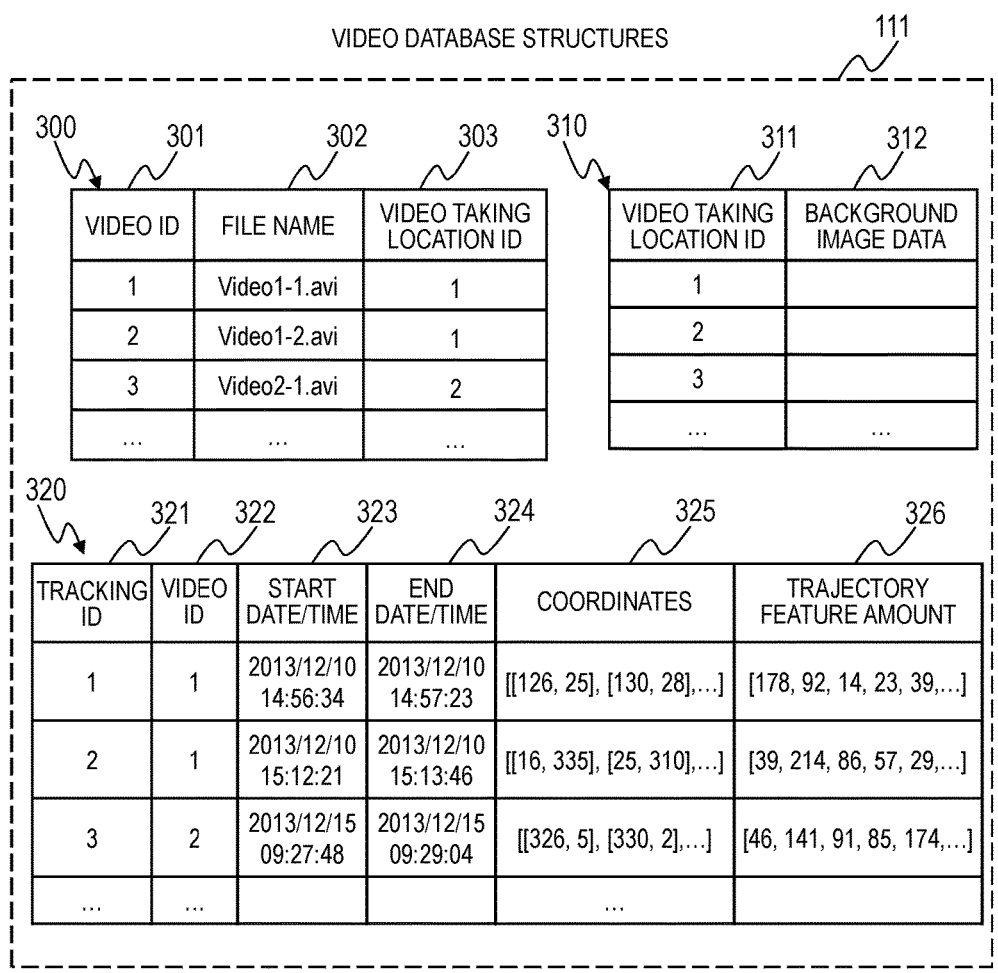
FIG. 3 is an explanatory diagram for illustrating the configuration and data example of a video database according to the first embodiment of this invention.

FIG. 3 is an explanatory diagram for illustrating the configuration and data example of the video database 111 according to the first embodiment of this invention. The video database 111, which is in a table format in the configuration example given here, can have any data format.

The video database 111 includes video data management information 300, background image data management information 310, and trajectory feature amount management information 320. The table configuration and the field configuration of each table in FIG. 3 are configurations necessary to carry out this invention, and tables and fields may be added depending on what application software is used.

The video data management information 300 includes a video ID field 301, a file name field 302, and a video taking location ID field 303. The video ID field 301 holds identification information of each piece of video data (hereinafter referred to as "video ID"). The file name field 302 holds the file name of video data read out of the video storage apparatus 101. In the case where video data is input from the video taking apparatus 102, the file name may be omitted. The video taking location ID field 303 holds identification information of a place observed by fixed-point observation (hereinafter referred to as "video taking location ID"). The association between a video ID and a video taking location may be managed by application software, or may be managed by adding video taking location management information (not shown) to the video database 111. In the case where input video data is of a video taken with a steady camera, a video taking location ID may be read as a camera ID. A plurality of video files may be registered for one video taking location as in the example of FIG. 3. In this case, the plurality of video files contain, for example, pieces of video data that are taken in different time slots with a single camera that is fixed in terms of installation place and video taking direction.

The background image data management information 310 includes a video taking location ID field 311 and a background image data field 312. The video taking location ID field 311 holds identification information of a video taking location where a background image is taken, and this identification information corresponds to the video taking location ID held in the video data management information 300. The background image data field 312 holds data of the background image taken in a place that is indicated by the video taking location ID field 311. A background image held in this field is displayed when the user enters the trajectory of a moving object to be searched for as described later, and therefore is desirably an image that is taken with the same camera that is used to take a moving object in the video taking location in question and that includes no moving object.

The trajectory feature amount management information 320 includes a tracking ID field 321, a video ID field 322, a start date/time field 323, an end date/time field 324, a coordinates field 325, and a trajectory feature amount filed 326.

The track ID field 321 holds identification information that is used by the moving object tracking module 108 to track each moving object separately (hereinafter referred to as "tracking ID"). Each trajectory obtained by tracking a moving object is assigned a unique tracking ID. The video ID field 322 holds an identification number of video data that includes an image of the moving object to be tracked. This identification number corresponds to the video ID held in the video data management information 300.

The start date/time field 323 and the end date/time field 324 hold the date/time at which an image that is the start point of the relevant trajectory was taken and the date/time at which an image that is the end point of the trajectory was taken, respectively. Based on the held dates/times, time points at which the moving object has traveled along the trajectory are identified. The coordinates field 325 holds coordinates on the screen at the time points of images of the tracked moving object. Each moving object forms a trajectory obtained by linking, in chronological order, coordinates that are held in the coordinates field 325. The trajectory feature amount field 326 holds a trajectory feature amount extracted from changes with time of the coordinates of the moving object in the video. The trajectory feature amount is expressed, for example, in the form of a vector having a fixed length, and can be extracted by any known method from values held in the coordinates field 325.

Figure 4:
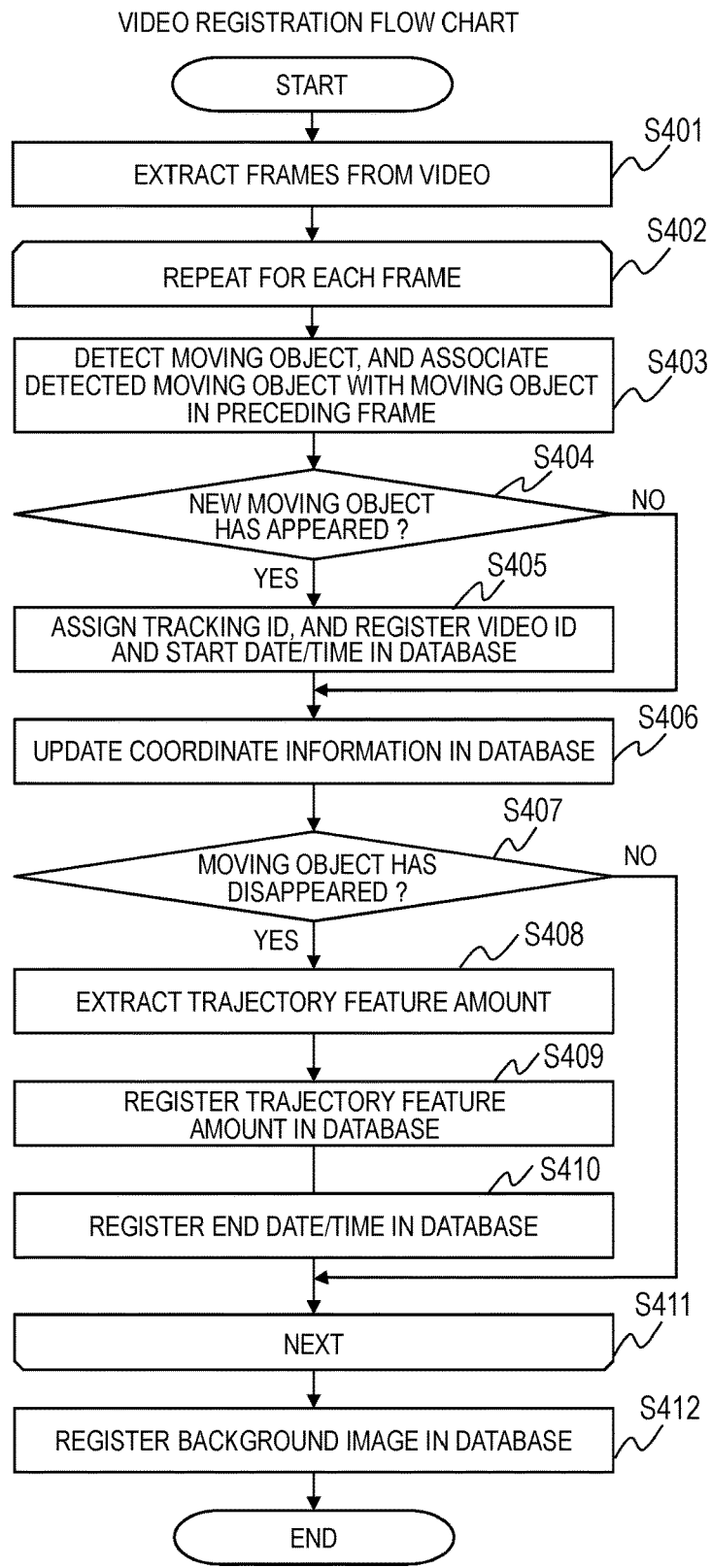
FIG. 4 is a flow chart for illustrating processing that is executed by a server computer to register an input video according to the first embodiment of this invention.

FIG. 4 is a flow chart for illustrating processing that is executed by the server computer 105 to register an input video according to the first embodiment of this invention. Steps of FIG. 4 are described below.

First, the video input module 106 decodes video data input from the video storage apparatus 101 or the video taking apparatus 102, and extracts frames as still images (Step S401).

Next, the modules in the server computer 105 execute Steps S402 to S411 for each frame extracted in Step S401.

The moving object tracking module 108 detects moving objects in the currently processed frame, and associates each detected moving object with a moving object that is detected in the timewise preceding frame (Step S403).

The moving object tracking module 108 next determines whether or not a new moving object has appeared (Step S404). Specifically, the moving object tracking module 108 determines that a new moving object has appeared in the case where a moving object detected in the currently processed frame is associated with none of moving objects detected in the timewise preceding frame (that is, when it is determined that the timewise preceding frame does not include an image of the same moving object as the moving object detected in the currently processed frame).

In the case where a new moving object has appeared, the moving object tracking module 108 assigns a new tracking ID to the new moving object, and the trajectory feature registering module 110 registers the new tracking ID, the video ID of the video in which the new moving object is detected, and a date/time at which the frame in which the new moving object is detected was taken in the tracking ID field 321, the video ID field 322, and the start date/time field 332, respectively, in the trajectory feature amount management information 320 of the video database 111 (Step S405). In the case where no new moving object has appeared, on the other hand, Step S405 is not executed.

The trajectory feature registering module 110 next adds the coordinates of each moving object detected in Step S403 to the coordinates field 325 in the trajectory feature amount management information 320 (Step S406).

Next, the moving object tracking module 108 determines whether or not a moving object has disappeared (Step S407). Specifically, the moving object tracking module 108 determines that a moving object detected in the timewise preceding frame has disappeared in the case where the moving object detected in the timewise preceding frame is associated with none of moving objects detected in Step S403 (that is, when it is determined that the currently processed frame does not include an image of the same moving object as the moving object detected in the timewise preceding frame).

In the case where a moving object has disappeared, the trajectory feature extracting module 109 extracts a trajectory feature amount from the trajectory of the disappeared moving object (Step S408). The extracted trajectory feature amount is subsequently registered in the trajectory feature amount field 326 in the trajectory feature amount management information 320 by the trajectory feature registering module 110 (Step S409). The date/time at which a frame in which the disappeared moving object is detected for the last time (i.e., the timewise preceding frame) was taken is registered in the end date/time field 324 (Step S410). In the case where no moving object has disappeared, on the other hand, Steps S408 to S410 are not executed because the trajectory in question may extend farther.

When Steps S403 to S410 are finished for every frame extracted from the video data, the frame registering module 107 registers a background image in the background image data field 312 of the background image data management information 310 that is associated with the video data in question (Step S412). Specifically, the frame registering module 107 registers as a background image one of the frames extracted in Step S401. For example, a frame in which no moving object is detected may be registered as a background image. It is sufficient if one background image is registered for one video taking location and, in the case of a video taking location for which a background image is already registered, the registered background image may be updated by executing Step S412 each time the processing of FIG. 4 is executed, or Step S412 may be omitted.

When the processing described above is finished for every frame, the processing of registering an input video is ended.

Figure 5:
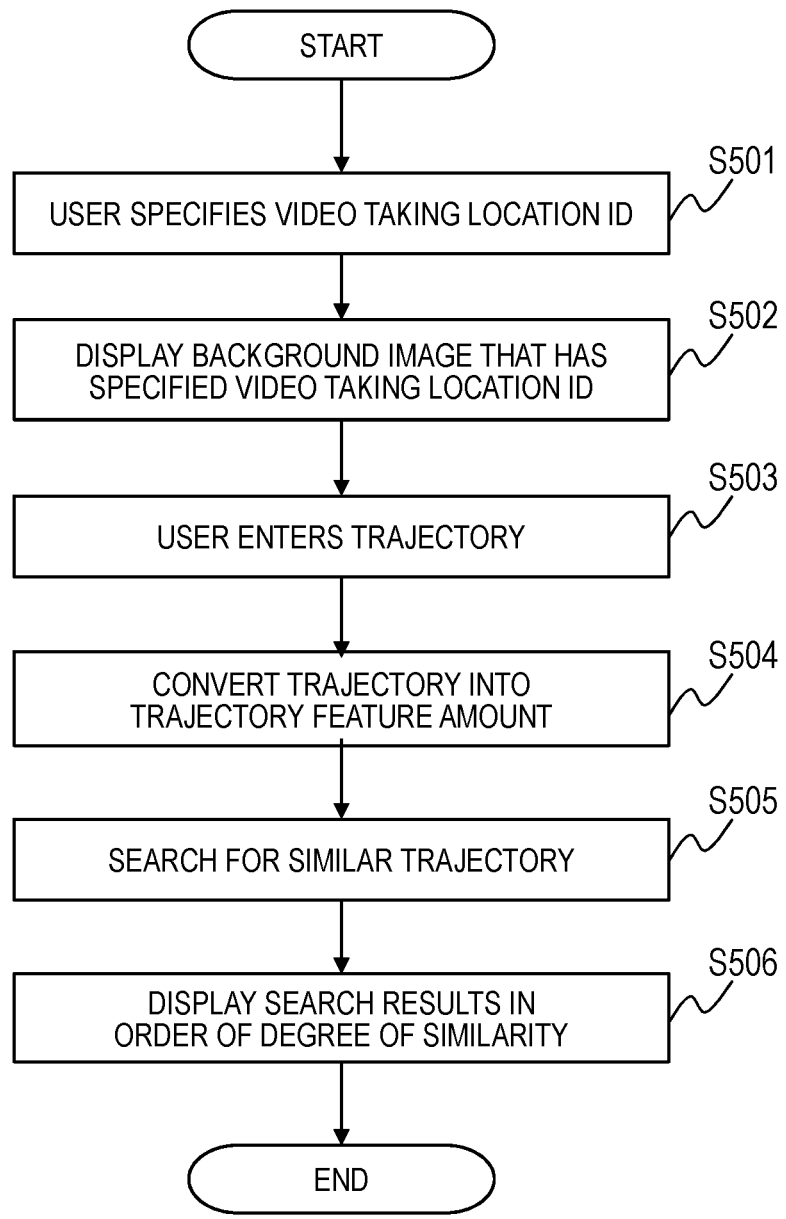
FIG. 5 is a flow chart for illustrating processing that is executed by the server computer to search for a trajectory according to the first embodiment of this invention.

FIG. 5 is a flow chart for illustrating processing that is executed by the server computer 105 to search for a trajectory according to the first embodiment of this invention. Steps of FIG. 5 are described below.

First, the user enters a video taking location ID to the server computer 105 by using the input apparatus 103 (Step S501). The server computer 105 refers to the background image data management information 310 to read background image data that is associated with the entered video taking location ID and, based on the read data, displays a background image on the display apparatus 104 (Step S502).

Next, the user enters a trajectory to the trajectory input module 112 by using the input apparatus 103 (Step S503). The trajectory feature converting module 113 converts the entered trajectory into a trajectory feature amount (Step S504). The conversion uses the same method that is executed by the trajectory feature extracting module 109 in Step S408 of FIG. 4 to extract a trajectory feature amount.

Next, the similar vector searching module 114 searches the trajectory feature amount management information 320 by using as a query the trajectory feature amount obtained through the conversion of Step S504 (Step S505). Trajectories similar to the trajectory entered by the user are found from the trajectory feature amount management information 320 in this manner.

The similar vector searching module 114 next outputs search results to the display apparatus 104, and the display apparatus 104 displays the search results in the order of the degree of similarity (Step S506).

This concludes the trajectory search processing.

Figure 6:
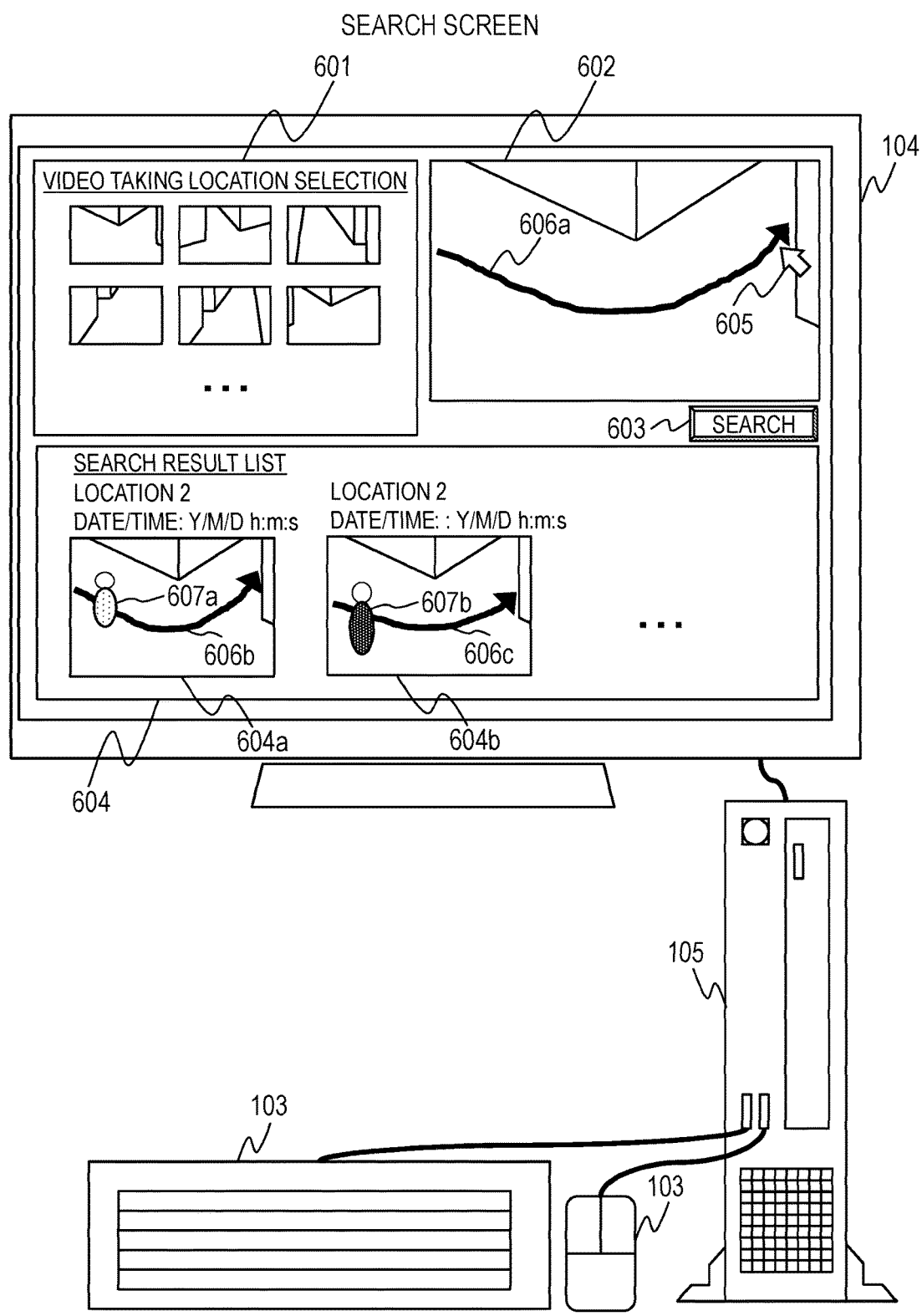
FIG. 6 is an explanatory diagram of a search screen that is output by the server computer according to the first embodiment of this invention.

FIG. 6 is an explanatory diagram of a search screen that is output by the server computer 105 according to the first embodiment of this invention. An example of how information from the user is input and how search results are displayed in the processing of FIG. 5 is described with reference to FIG. 6.

The search screen displayed on the display apparatus 104 includes a video taking location selection area 601, a video taking location display area 602, a search button 603, and a search result display area 604.

The video taking location selection area 601 displays background images of video taking locations that are registered in the background image data management information 310. The user operates the input apparatus 103 to select one of the background images, thereby specifying a video taking location ID that is associated with the selected background image (Step S501), and the background image of the specified video taking location is displayed in the video taking location display area 602 (Step S502). For example, reduced background images of video taking locations may be displayed in the video taking location selection area 601, while the video taking location display area 602 displays the expanded background image of a specified video taking location.

The user enters a trajectory on the background image displayed in the video taking location display area 602 (Step S503). For example, the user operates a mouse that is the input apparatus 103 to position a pointer (mouse cursor) 605 at the start point of a trajectory to be entered, presses down on a mouse button to drag the pointer 605 along the trajectory, and releases the mouse button at the end point of the trajectory. A trajectory 606a is input in this manner.

In the case where the display apparatus 104 is a touch panel to have the functions of the input apparatus 103 as well, the user may enter a trajectory by touching, with a finger, a pen, or the like, the start point of the trajectory on the background image displayed in the video taking location display area 602, and swiping along the trajectory to the end point. Alternatively, the server computer 105 may generate a trajectory by interpolating Bézier curves or the like between several points on the background image that are specified by the user with mouse clicks or touches. In the example of FIG. 6, the direction of an arrow of the trajectory 606a is a direction from the start point of the trajectory toward the end point of the trajectory, and indicates the trajectory of a moving object that travels in that direction. The same applies to other trajectories described later. The server computer 105 may determine the direction of an entered trajectory by recognizing, as the end point of the trajectory, the position of the pointer 605 at which the mouse button is released, or a point at which the user lifts the finger from the touch panel. The server computer 105 may further display an arrow at the end point of the trajectory automatically.

The entered trajectory 606a is converted into a trajectory feature amount (Step S504). When the user uses the mouse or the like to operate the search button 603, a similar trajectory search is executed (Step S505), and results of the search are displayed in the search result display area 604 (Step S506). Images 604b and 604b along with other images (not shown) are displayed as the search results as illustrated in FIG. 6.

The image 604a displays a trajectory 606b obtained as a search result on the background image of the specified video taking location, and further displays an image of a moving object (a person in this example) 607a that is associated with this trajectory 606b. In other words, the trajectory 606b is a trajectory along which the moving object 607a has traveled. The image 604a may be generated by, for example, superimposing an arrow that represents a found trajectory on an image of a frame of one point between the start date/time and end date/time of the found trajectory. In this case, a date/time at which the displayed frame has been taken may be displayed as illustrated in FIG. 6. The image 604b similarly includes another found trajectory 606c and an image of a moving object 607b that is associated with the trajectory 606c.

The search result display area 604 may display only an arrow that represents a found trajectory, without displaying a background image and an image of a moving object. Instead of an image of a frame at one point in time (i.e., a still image), a video from the start date/time to end date/time of a found trajectory may be played and displayed in the search result display area 604.

While a video taking location and a trajectory are specified as search terms in the example of FIG. 5 and FIG. 6, a time may additionally be specified. In this case, the search screen of FIG. 6 is further provided with a time specification area (not shown), and the user operates the input apparatus 103 to enter a time (for example, a time slot to be searched). Then the search is conducted among trajectories whose start time and end time are within the time slot specified by the user. Alternatively, a video taking location may not be specified as a search term. Similar trajectories are in this case searched for irrespective of the location of video taking.

According to the first embodiment of this invention described above, the trajectory of a moving object that is similar to an arbitrary trajectory specified by the user can be searched for. This means that, for example, even when a video that actually captures a moving object to be searched for is not identified, if the trajectory of the moving object can be estimated from sighting information, the surrounding circumstances, or the like, an image of a moving object that has traveled in a trajectory similar to the estimated trajectory can be searched for.

Second Embodiment

The image search system 100 according to a second embodiment of this invention is described next. Components of the image search system 100 of the second embodiment have the same functions as those of the components of the first embodiment described with reference to FIG. 1 to FIG. 6 that are denoted by the same reference symbols, except for differences described below. Descriptions thereof are therefore omitted.

Figure 7:
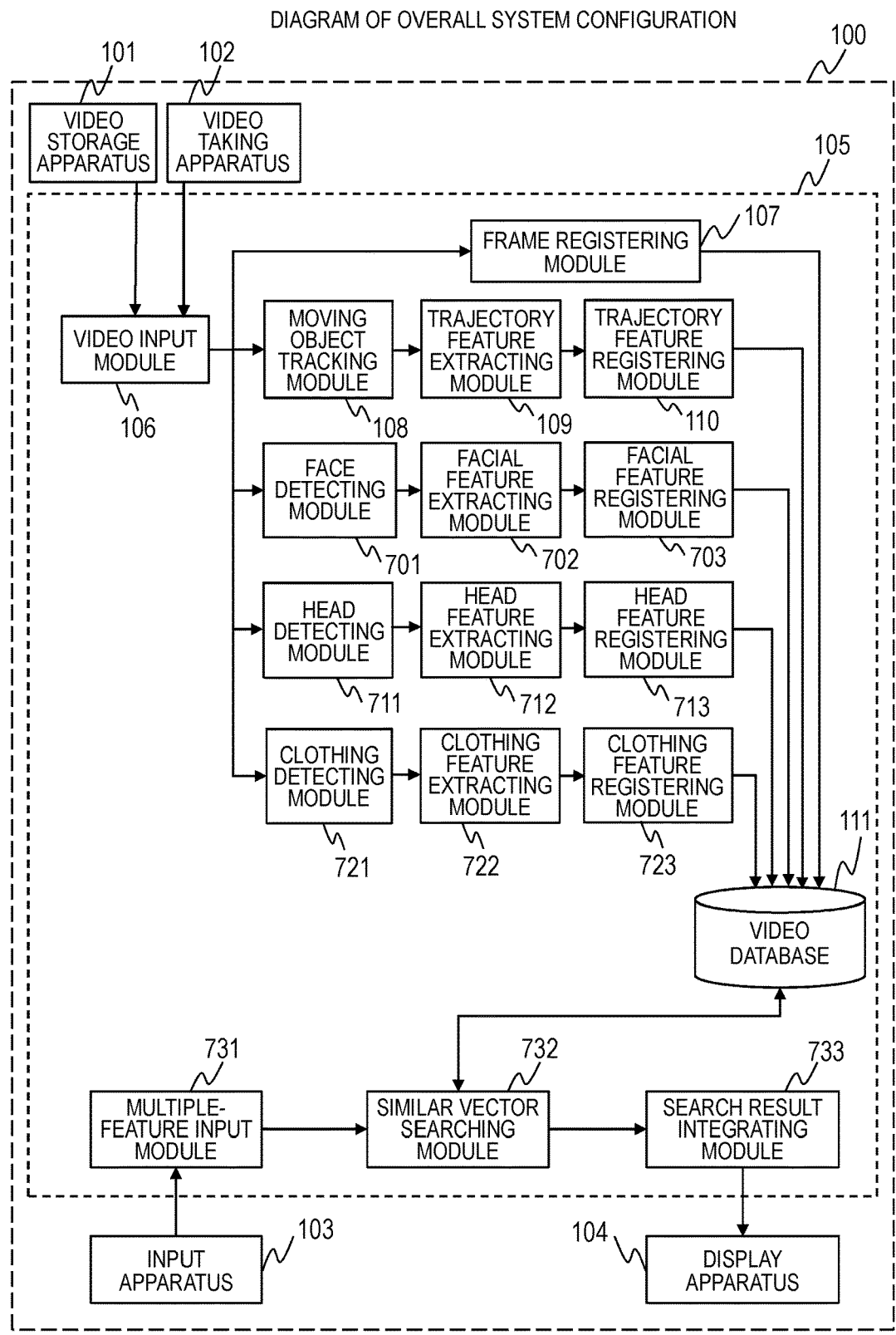
FIG. 7 is a diagram for illustrating the overall configuration of an image search system according to a second embodiment of this invention.

FIG. 7 is a diagram for illustrating the overall configuration of the image search system 100 according to the second embodiment of this invention.

The image search system 100 of this embodiment includes the video storage apparatus 101, the video taking apparatus 102, the input apparatus 103, the display apparatus 104, and the server computer 105. The video storage apparatus 101, the video taking apparatus 102, the input apparatus 103, and the display apparatus 104 are the same as those in the first embodiment, and descriptions thereof are therefore omitted.

The server computer 105 of the second embodiment includes, in addition to the video input module 106, the frame registering module 107, the moving object tracking module 108, the trajectory feature extracting module 109, the trajectory feature registering module 110, which are the same as those in the first embodiment, a face detecting module 701, a facial feature extracting module 702, a facial feature registering module 703, a head detecting module 711, a head feature extracting module 712, a head feature registering module 713, a clothing detecting module 721, a clothing feature extracting module 722, a clothing feature registering module 723, a multiple-feature input module 731, a similar vector searching module 732, and a search result integrating module 733. The server computer 105 of the second embodiment also includes the video database 111, but some information stored therein differs from the information stored in the video database 111 of the first embodiment as described later with reference to FIG. 8A and FIG. 8B.

The face detecting module 701, the head detecting module 711, and the clothing detecting module 721 are configured to detect a person's face area, head area, and clothing area, respectively, in an image of a frame. The facial feature extracting module 702, the head feature extracting module 712, and the clothing feature extracting module 722 are configured to extract image feature amounts of the face area, the head area, and the clothing area, respectively. The extracting modules may extract feature amounts of any type that can be extracted from an image, for example, edge information or color information. The extraction of image feature amounts as those can use known methods and any other methods. The facial feature registering module 703, the head feature registering module 713, and the clothing feature registering module 723 are configured to register image feature amounts extracted from the face area, the head area, and the clothing area, respectively (hereinafter also referred to as "facial feature amount", "head feature amount", and "clothing feature amount", respectively), in the video database 111.

The multiple-feature input module 731 is configured to receive information specifying feature amounts that the user enters as search keys by operating the input apparatus 103 (for example, a trajectory feature amount, a facial feature amount, a head feature amount, and a clothing feature amount). The similar vector searching module 732 is configured to search the video database 111 for a feature amount vector that is similar to a feature amount vector specified as a search key. The search result integrating module 733 is configured to combine results of a plurality of searches based on search keys that are feature amounts of a plurality of types, and to output the combined results. Details of the processing procedures are described later with reference to FIG. 10.

The second embodiment deals with an example of the image search system 100 in the case where a moving object to be tracked is a person. The face area, the head area, and the clothing area are an example of areas considered to be sources of image information that can be used in the identification of a person (hereinafter also referred to as "prominent areas"). The server computer 105 may accordingly include prominent area detecting modules configured to detect other prominent areas than the ones given above, image feature amount extracting modules configured to extract image feature amounts from the detected areas, and image feature amount registering modules configured to register the extracted image feature amounts (all not shown). Examples of other prominent areas than the ones given above include a mouth area, which is a part of the face area, a hair area, which is a part of the head area, and an upper body area, a lower body area, or an area of the person's belongings (e.g., a bag area) as a part of the clothing area.

In the case where a moving object to be tracked is other objects than a person, prominent areas appropriate for the type of the object are detected, and feature amounts of the detected areas are registered. When an object to be tracked is an automobile, for example, the front, back, side, tires, number plate, and the like of an automobile may be detected as prominent areas.

The image search system 100 of the second embodiment has the same hardware configuration as that of the image search system 100 of the first embodiment illustrated in FIG. 2, and a description thereof is therefore omitted. Processing executed by the function modules of the server computer 105 of the second embodiment is actually executed by the processor 201, which follows commands written in the processing program 203.

Figure 8A:
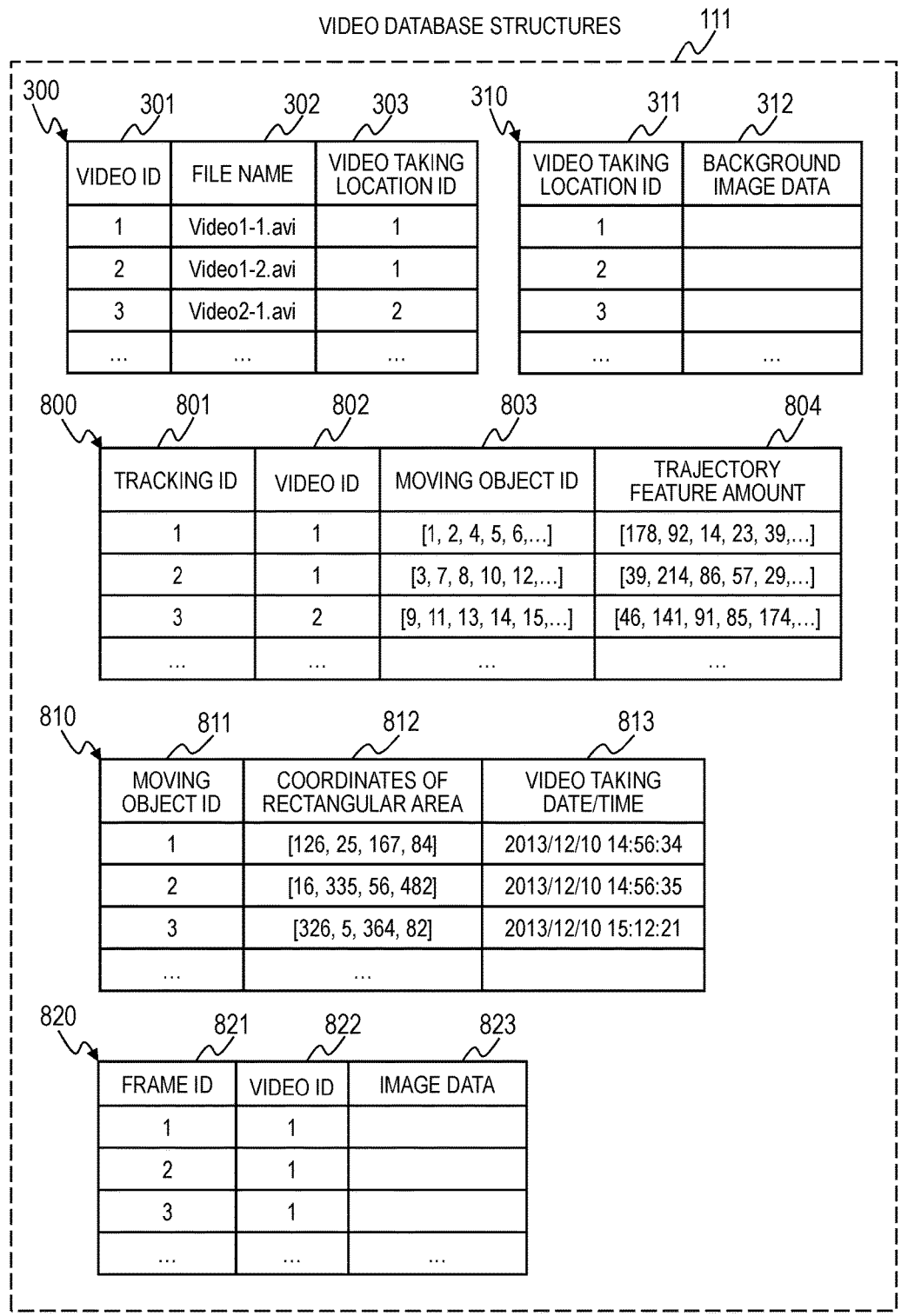

FIG. 8A and FIG. 8B are explanatory diagrams for illustrating the configuration and data example of the video database 111 according to the second embodiment of this invention. The video database 111, which is in a table format in the configuration example given here, can have any data format.

The video database 111 includes the video data management information 300, the background image data management information 310, trajectory feature amount management information 800, moving object management information 810, and frame image management information 820, which are illustrated in FIG. 8A, and facial feature amount management information 830, head feature amount management information 840, and clothing feature amount management information 850, which are illustrated in FIG. 8B. The table configuration and the field configuration of each table in FIG. 8A and FIG. 8B are configurations necessary to carry out this invention, and tables and fields may be added depending on what application software is used.

The video data management information 300 and the background image data management information 310 in the second embodiment are the same as the ones in the first embodiment, and descriptions thereof are therefore omitted.

The trajectory feature amount management information 800 includes a tracking ID field 801, a video ID field 802, a moving object ID field 803, and a trajectory feature amount field 804. The tracking ID field 801, the video ID field 802, and the trajectory feature amount field 804 are the same as the tracking ID field 321, the video ID field 322, and the trajectory feature amount field 326 in the first embodiment, respectively, and descriptions thereof are therefore omitted.

The moving object ID field 803 holds a list of pieces of identification information of moving objects (hereinafter referred to as "moving object IDs") that draw trajectories and that are detected in frames. The moving object ID is not for identifying a moving object itself, and is for identifying an image of a moving object that is detected in each frame separately. In the case where images of the same moving object are detected in a plurality of frames, a different (unique) moving object ID is assigned to each image of the moving object, and the assigned moving object IDs are associated with one tracking ID.

For example, values "1, 2, 4, 5, 6 . . . " registered in the moving object ID field 803 in association with a tracking ID "1" as illustrated in FIG. 8A mean that a moving object image that is detected in one frame and identified by a moving object ID "1", a moving object image that is detected in another frame and identified by a moving object ID "2", and moving object images that are each similarly detected in a different frame and identified by a moving object ID "4", "5", or "6" are associated with one another by the moving object tracking module 108 (that is, that the moving object images are determined as images of the same moving object).

The moving object management information 810 includes a moving object ID field 811, a coordinates of rectangular area field 812, and a video taking date/time field 813.

The moving object ID field 811 holds the moving object ID of a moving object detected in each frame. The definition of this moving object ID corresponds to that of moving object IDs held in the moving object ID field 803 of the trajectory feature amount management information 800.

The coordinates of rectangular area field 812 holds coordinates indicating a rectangular area that the moving object image detected in the frame in question takes up in an image of the frame. The coordinates held in this field may be expressed in the form of, for example, the "upper-left corner horizontal coordinate, upper-left corner vertical coordinate, lower-right corner horizontal coordinate, and lower-right corner vertical coordinate" of a circumscribed rectangle of the moving object, or may be expressed by the center coordinates, width, and height of the rectangle. The same applies to the expression of coordinates of rectangular area held in coordinates of rectangular area fields 833, 843, and 853, which are described later.

The video taking date/time field 813 holds the date/time at which a frame that includes the detected moving object image was taken.

The frame image management information 820 includes a frame ID field 821, a video ID field 822, and an image data field 823.

The frame ID field 821 holds identification information of each frame (hereinafter referred to "frame ID") extracted from video data. The video ID field 822 holds a video ID for identifying a video from which the frame is extracted. This video ID corresponds to the value held in the video ID field 301 of the video data management information 300. The image data field 823 holds data that is binary data of a still image of the frame and that is used when a search result or the like is displayed on the display apparatus 104.

The facial feature amount management information 830 includes a face ID field 831, a frame ID field 832, a coordinates of rectangular area field 833, and a facial feature amount field 834.

The face ID field 831 holds identification information of a face area (hereinafter referred to as "face ID") detected in an image of a frame by the face detecting module 701. The frame ID field 832 holds the frame ID of the frame in which the face area is detected. This frame ID corresponds to the one held in the frame ID field 821 of the frame image management information 820. The coordinates of rectangular area field 833 holds coordinates indicating a range that the detected face area takes up in the frame image. The facial feature amount field 834 holds an image feature amount extracted from the detected face area by the facial feature extracting module 702.

The head feature amount management information 840 includes a head ID field 841, a frame ID field 842, a coordinates of rectangular area field 843, and a head feature amount field 844.

The head ID field 841 holds identification information of a head area (hereinafter referred to as "head ID") detected in an image of a frame by the head detecting module 711. The frame ID field 842 holds the frame ID of the frame in which the head area is detected. This frame ID corresponds to the one held in the frame ID field 821 of the frame image management information 820. The coordinates of rectangular area field 843 holds coordinates indicating a range that the detected head area takes up in the frame image. The head feature amount field 844 holds an image feature amount extracted from the detected head area by the head feature extracting module 712.

The clothing feature amount management information 850 includes a clothing ID field 851, a frame ID field 852, a coordinates of rectangular area field 853, and a clothing feature amount field 854.

The clothing ID field 851 holds identification information of a clothing area (hereinafter referred to as "clothing ID") detected in an image of a frame by the clothing detecting module 721. The frame ID field 852 holds the frame ID of the frame in which the clothing area is detected. This frame ID corresponds to the one held in the frame ID field 821 of the frame image management information 820. The coordinates of rectangular area field 853 holds coordinates indicating a range that the detected clothing area takes up in the frame image. The clothing feature amount field 854 holds an image feature amount extracted from the detected clothing area by the clothing feature extracting module 722.

In the case where other prominent areas than those given above are detected and feature amounts are extracted from the prominent areas, information about the detected prominent areas that is similar to the information described above is held in the video database 111.

Figure 9:
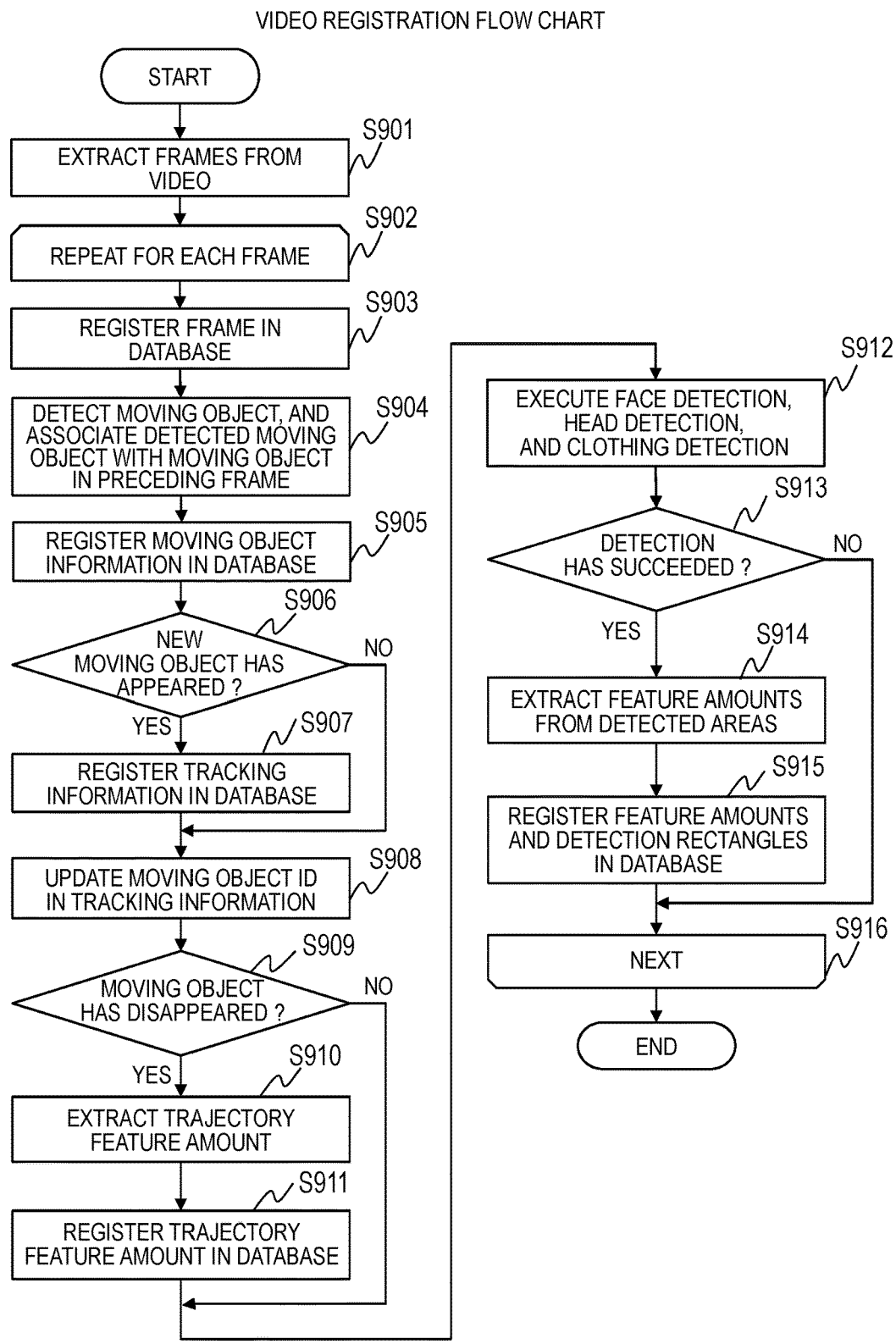
FIG. 9 is a flow chart for illustrating processing that is executed by a server computer to register an input video according to the second embodiment of this invention.

FIG. 9 is a flow chart for illustrating processing that is executed by the server computer 105 to register an input video according to the second embodiment of this invention. Steps of FIG. 9 are described below.

First, the video input module 106 decodes video data input from the video storage apparatus 101 or the video taking apparatus 102, and extracts frames as still images (Step S901).

Next, the modules in the server computer 105 execute Steps S902 to S916 for each frame extracted in Step S901.

The frame registering module 107 registers the extracted frame in the frame image management information 820 of the video database 111 (Step S903).

The moving object tracking module 108 detects moving objects in the currently processed frame, and associates each detected moving object with a moving object that is detected in the timewise preceding frame (Step S904).

Next, the trajectory feature registering module 110 registers information of the detected moving object in the moving object management information 810 of the video database 111 (Step S905).

The moving object tracking module 108 next determines whether or not a new moving object has appeared (Step S906). The determination can use the same method that is used in Step S404 of FIG. 4.

In the case where a new moving object has appeared, the moving object tracking module 108 assigns a new tracking ID to the new moving object, and the trajectory feature registering module 110 registers the new tracking ID and the video ID of the video in which the new moving object is detected in the trajectory feature amount management information 800 of the video database 111 (Step S907). In the case where no new moving object has appeared, on the other hand, Step S907 is not executed.

Next, the trajectory feature registering module 110 updates moving object IDs registered in the trajectory feature amount management information 800 in a manner that is determined by the result of the association in Step S904 (Step S908). Specifically, in the case where a moving object detected in Step S904 is determined as a newly appeared object, the trajectory feature registering module 110 adds the moving object ID of this moving object to the moving object ID field 803 that is associated with the tracking ID added in Step S907, and, in the case where a moving object detected in Step S904 is associated with a moving object detected in the timewise preceding frame, the trajectory feature registering module 110 adds the moving object ID of the moving object detected in Step S904 to the moving object ID field 803 that is associated with the same tracking ID as the tracking ID of the moving object of the timewise preceding frame.

Next, the moving object tracking module 108 determines whether or not a moving object has disappeared (Step S909). The determination can use the same method that is used in Step S407 of FIG. 4.

In the case where a moving object has disappeared, the trajectory feature extracting module 109 extracts a trajectory feature amount from the trajectory of the disappeared moving object (Step S910). The extracted trajectory feature amount is subsequently registered in the trajectory feature amount field 804 in the trajectory feature amount management information 800 by the trajectory feature registering module 110 (Step S911). In the case where no moving object has disappeared, on the other hand, Steps S910 and S911 are not executed because the trajectory in question may extend farther.

Next, the face detecting module 701, the head detecting module 711, and the clothing detecting module 721 detect a face area, a head area, and a clothing area, respectively, in the image of the currently processed frame (Step S912). The detection can be executed by known methods and any other methods.

The face detecting module 701, the head detecting module 711, and the clothing detecting module 721 next separately determine whether or not the detection of their respective areas has been a success (Step S913).

In the case where the face detecting module 701 succeeds in detecting a face area, the facial feature extracting module 702 extracts an image feature amount from the detected face area (Step S914), and the facial feature registering module 703 registers coordinates indicating the range of the detected face area and the extracted image feature amount in the coordinates of rectangular area field 833 and the facial feature amount field 834, respectively, that are associated with the frame ID of the currently processed frame (Step S915).

In the case where the head detecting module 711 succeeds in detecting a head area, the head feature extracting module 712 extracts an image feature amount from the detected head area (Step S914), and the head feature registering module 713 registers coordinates indicating the range of the detected head area and the extracted image feature amount in the coordinates of rectangular area field 843 and the head feature amount field 844, respectively, that are associated with the frame ID of the currently processed frame (Step S915).

In the case where the clothing detecting module 721 succeeds in detecting a clothing area, the clothing feature extracting module 722 extracts an image feature amount from the detected clothing area (Step S914), and the clothing feature registering module 723 registers coordinates indicating the range of the detected clothing area and the extracted image feature amount in the coordinates of rectangular area field 853 and the clothing feature amount field 854, respectively, that are associated with the frame ID of the currently processed frame (Step S915).

When the processing described above is finished for every frame, the processing of registering an input video is ended.

Figure 10:
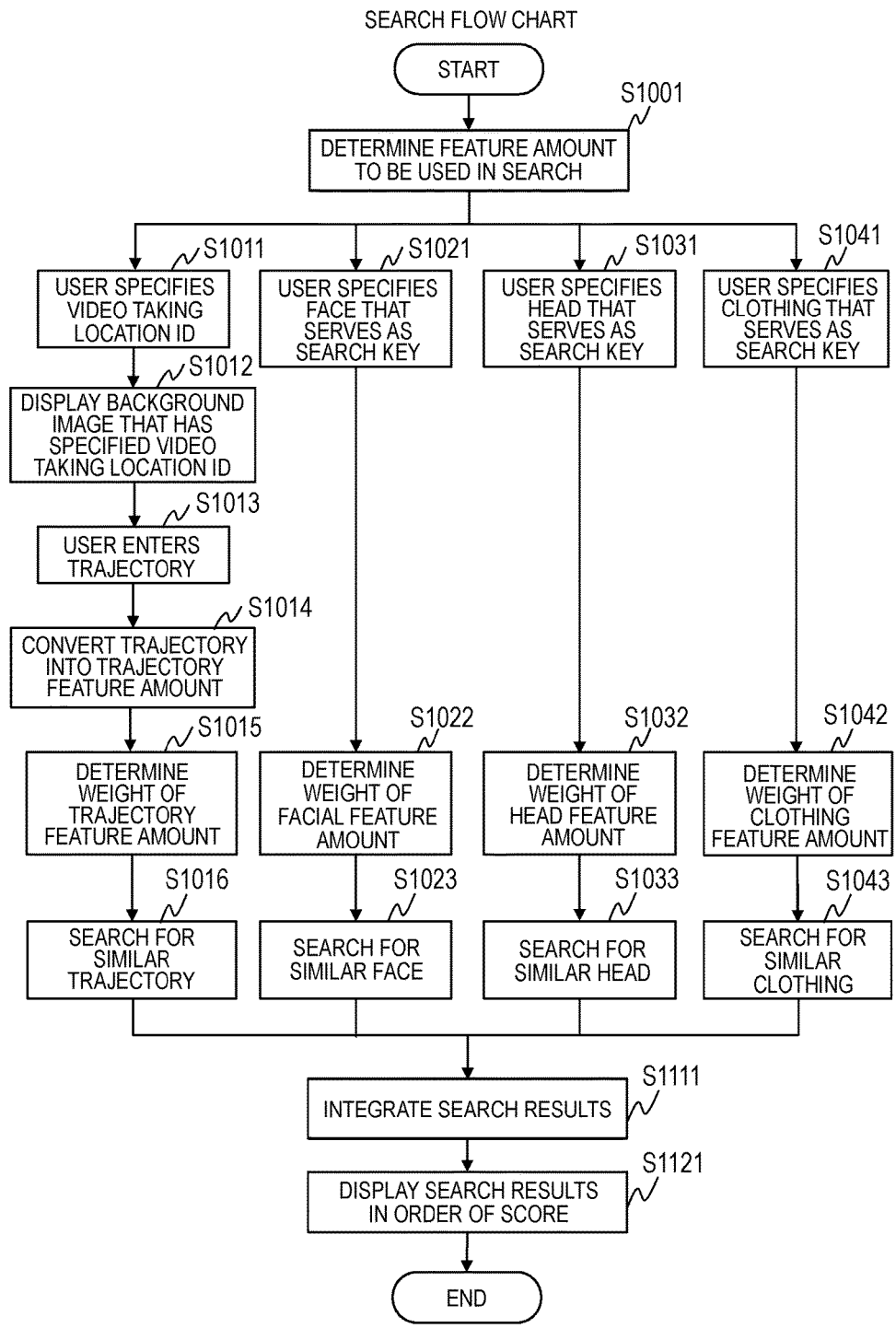
FIG. 10 is a flow chart for illustrating search processing that is executed by the server computer according to the second embodiment of this invention.

FIG. 10 is a flow chart for illustrating search processing that is executed by the server computer 105 according to the second embodiment of this invention. Steps of FIG. 10 are described below.

First, the user determines what feature amounts are to be used in the search, and enters the determined feature amounts (Step S1001). A case where a trajectory feature amount, a facial feature amount, a head feature amount, and a clothing feature amount are determined to be used in the search is described here.

When feature amounts to be used in the search are determined as described above, the server computer 105 executes search processing that uses the trajectory feature amount (Steps S1011 to S1016), search processing that uses the facial feature amount (Steps S1021 to S1023), search processing that uses the head feature amount (Steps S1031 to S1033), and search processing that uses the clothing feature amount (Steps S1041 to S1043) in an arbitrary order or in parallel to one another.

The search processing that uses the trajectory feature amount (Steps S1011 to S1016) is described first. The server computer 105 first executes Steps S1011 to S1014 sequentially. Steps S1011 to S1014 are the same as Steps S501 to S504 of FIG. 5, and descriptions thereof are therefore omitted. However, inputs from the user are received by the multiple-feature input module 731. Next, the user determines the weight of the trajectory feature amount by operating the input apparatus 103 (Step S1015). Next, the similar vector searching module 732 searches the trajectory feature amount management information 800 of the video database 111 for trajectories that are similar to the trajectory entered in Step S1013 (Step S1016). This search processing is executed the same way as in Step S505 of FIG. 5.

The search processing that uses the facial feature amount (Steps S1021 to S1023) is described next. First, the user sets a face that serves as a search key by operating the input apparatus 103 (Step S1021). The user next operates the input apparatus 103 to determine the weight of the facial feature amount (Step S1022). Next, the similar vector searching module 732 searches the facial feature amount management information 830 for faces that resemble the face set as a search key in Step S1021 (Step S1023). Specifically, the similar vector searching module 732 can search for faces that resemble the search key by using the Euclidean distance between the vector of an image feature amount of the face set as the search key in Step S1021 and the vector of a facial feature amount held in the facial feature amount management information 830, as in the similar trajectory search (Steps S505 and S1016). The same applies to a similar head search (Step S1033) and a similar clothing search (Step S1043), which are described later.

The search processing that uses the head feature amount (Steps S1031 to S1033) is described next. First, the user sets a head that serves as a search key by operating the input apparatus 103 (Step S1031). The user next operates the input apparatus 103 to determine the weight of the head feature amount (Step S1032). Next, the similar vector searching module 732 searches the head feature amount management information 840 for heads that resemble the head set as a search key in Step S1031 (Step S1033).

The search processing that uses the clothing feature amount (Steps S1041 to S1043) is described next. First, the user sets piece of a clothing that serves as a search key by operating the input apparatus 103 (Step S1041). The user next operates the input apparatus 103 to determine the weight of the clothing feature amount (Step S1042). Next, the similar vector searching module 732 searches the clothing feature amount management information 850 for pieces of clothing that resemble the piece of clothing set as a search key in Step S1041 (Step S1043).

Next, the search result integrating module 733 integrates the results of the searches of Steps S1016, S1023, S1033, and S1043 (Step S1111). Specifically, the search result integrating module 733 multiplies the degrees of similarity of a trajectory feature amount, a facial feature amount, a head feature amount, and a clothing feature amount that are found through the searches by the weight coefficients determined in Steps S1015, S1022, S1032, and S1042, respectively, and adds up the resultant values to calculate a score for the comprehensive degree of similarity. The search result integrating module 733 in this step may use the set weight coefficients as they are, or may use values that are obtained by normalization that makes the sum of all weight coefficients 1.

To which person registered in the moving object management information 810 a facial feature amount registered in the facial feature amount management information 830 belongs, for example, can be determined based on whether or not (or to what degree) coordinates of rectangular area registered in the facial feature amount management information 830 overlap with coordinates of rectangular area registered in the moving object management information 810. The same applies to the head feature amount and the clothing feature amount. In order to facilitate this determination, the moving object management information 810 may further include, for each moving object image, a frame ID for identifying a frame from which the moving object image is extracted.

The search result integrating module 733 next outputs search results and scores to the display apparatus 104, and the display apparatus 104 displays the search results in descending order of the score (Step S1121).

This concludes the search processing.

Figure 11:
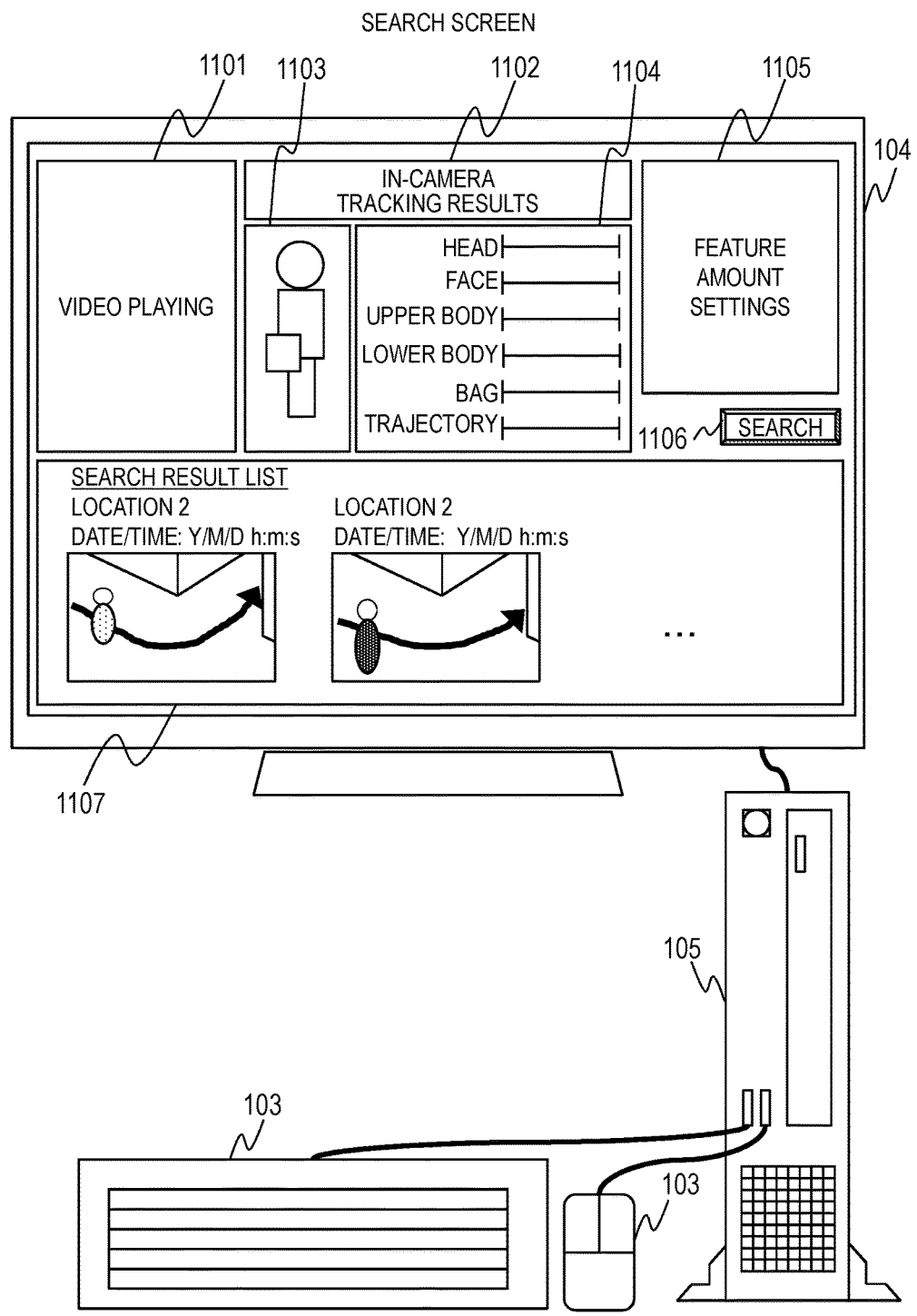
FIG. 11 is an explanatory diagram of a search screen that is output by the server computer according to the second embodiment of this invention.

FIG. 11 is an explanatory diagram of a search screen that is output by the server computer 105 according to the second embodiment of this invention. An example of how information from the user is input and how search results are displayed in the processing of FIG. 10 is described with reference to FIG. 11.

The search screen displayed on the display apparatus 104 of the second embodiment includes a video playing area 1101, an in-camera tracking result display area 1102, a complete picture display area 1103, a weight setting area 1104, a feature amount setting area 1105, a search button 1106, and a search result display area 1107.

A video that has been taken in a video taking location selected by the user is played and displayed in the video playing area 1101. While omitted from FIG. 11, the video taking location selection area 601 of FIG. 6 may be displayed on the display apparatus 104 of the second embodiment in order to enable the user to select a video taking location.

When the user specifies one of moving objects that are included in the displayed video, the result of tracking the specified moving object throughout the video is displayed in the in-camera tracking result display area 1102. An example in which the moving object is a person is described here. For example, a plurality of images of the specified person cut out of a plurality of frame images of the video in question may be sorted and displayed by date/time at which the image was taken. The purpose of a search that is about to be executed is to find an image of a person who has features close to features specified by the user from the video in question, or from another video taken in the same place as that of the video in question, or from a video taken in a different place. In the case where an image of the same person as that person (or a different person who has similar features) is found from the video displayed in the video playing area 1101, the found image can be specified.

However, in the case where setting a search key does not require reference to a moving object image, e.g., the case where only a feature amount that is set based on sighting information (described later) is set as a search key, the user does not need to specify an image displayed in the video playing area 1101.

The complete picture display area 1103 schematically displays the complete picture of the moving object. In the example of FIG. 11, a schematic view of a person that includes the person's head area, face area, upper body area, lower body area, bag area, and other areas is displayed.

The weight setting area 1104 displays slide bars or other setting means for setting the weights of the respective feature amounts. In the example of FIG. 11, slide bars for setting the weights of the feature amounts of the areas displayed in the complete picture display area 1103 and of the trajectory feature amount are displayed. While a slide bar is displayed for each of the head feature amount, the facial feature amount, the upper body feature amount, the lower body feature amount, the bag feature amount, and the trajectory feature amount in the example of FIG. 11, slide bars for the head, the face, the clothing, and the trajectory may be displayed as described above with reference to FIG. 7 to FIG. 10, and slide bars for feature amounts of any other prominent areas may also be displayed.

The feature amount setting area 1105 displays a feature amount setting screen as described below through a specific example.

When deciding to use a trajectory feature amount in the search (Step S1001), for example, the user selects "trajectory" in the weight setting area 1104, and specifies a video taking location ID (Step S1011). A background image of the specified video taking location is then displayed in the feature amount setting area 1105 (Step S1012). The user subsequently enters a trajectory that serves as a search key on the background image displayed in the feature amount setting area 1105 (Step S1013). This input can be made the same way as in Step S503 of the first embodiment. The trajectory feature extracting module converts the entered trajectory into a trajectory feature amount (Step S1014). The user further sets the weight of the trajectory feature amount by operating a slide bar displayed in the weight setting area 1104 that is for "trajectory" (Step S1015).

When deciding to use a facial feature amount in the search (Step S1001), the user selects "face" in the weight setting area 1104, and sets a face that serves as a search key (Step S1021). For example, the feature amount setting area 1105 displays a plurality of face images cut out of a plurality of images displayed in the in-camera tracking result display area 1102, and the user selects one of the face images, thereby setting the selected face image as a search key. The user further sets the weight of the facial feature amount by operating a slide bar displayed in the weight setting area 1104 that is for "face" (Step S1022).

Similarly, when deciding to use a head feature amount in the search (Step S1001), the user selects "head" in the weight setting area 1104, sets a head that serves as a search key (Step S1031), and sets the weight of the head feature amount (Step S1032). The steps of setting the head feature amount and the weight thereof can be executed the same way as, for example, the setting of the facial feature amount and the weight thereof.

When deciding to use a clothing feature amount in the search, the user selects "clothing" in the weight setting area 1104 (in the example of FIG. 11, any one of the "upper body" and the "lower body" may be selected), sets a piece of clothing that serves as a search key (Step S1041), and sets the weight of the clothing feature amount (Step S1042). The steps of setting the clothing feature amount and the weight thereof can be executed the same way as, for example, the setting of the facial feature amount and the weight thereof.

In the case where a color feature amount, for example, is set as a clothing feature amount, the feature amount setting area 1105 may display color samples, a color palette, or the like, instead of clothing images cut out of images displayed in the in-camera tracking result display area 1102, to allow the user to select one of the colors.

While omitted from FIG. 10, feature amounts of other prominent areas (e.g., a bag area) can be set in the same manner that is described above. A set feature amount (e.g., a color) may be reflected on the schematic view of the person displayed in the complete picture display area 1103.

When the user operates the search button 1106, similar vector searches are conducted for the feature amounts that the user has decided to use in the searches (Steps S1016, S1023, S1033, and S1043). The results of the searches are integrated based on the set weights (Step S1111), and the search results are displayed in the order of score in the search result display area 1107 (Step S1121). The search result display area 1107 can be the same as the search result display area 604 of the first embodiment, and a description thereof is therefore omitted.

According to the second embodiment of this invention, a search for a moving object image based on at least one image feature amount, not just the trajectory feature amount used in the first embodiment, can thus be conducted. The second embodiment allows the user to specify as a search key not only an image feature amount that is obtained from an actually taken image (for example, the feature amount of a face image that is cut out of a video displayed in the video playing area 1101) but also an image feature amount that is entered directly by the user (for example, a color feature amount selected by the user from color samples). In another example, when an image is available of a person who is not a person to be searched for and who carries around an article similar to one that is surmised to be a belonging of the person to be searched for (e.g., a bag), a feature amount of the belonging that is extracted from the image can be specified as a search key.

In the case of a search that uses a plurality of feature amounts as search keys as described above, the search results are weighted and then integrated. For example, when the user wishes to place a particular importance on one of feature amounts, this feature amount can be weighted heavy. The user may also set the weight of a set search key based on, for example, the degree of certainty of the search key, or the ease of identifying a moving object with the use of the search key. Specifically, in the case where a color feature amount of clothing is set based on sighting information, for example, a heavier weight may be set when the degree of certainty of the sighting information is greater. In the case where a bag feature amount is set, for example, a heavier weight may be set when the rareness of the bag is higher. Alternatively, automated weight setting may be employed in which the server computer 105 determines, for example, the "face-likeness" of an image that is included in the face area, and a heavier weight is given when the face-likeness is higher. The same applies to other prominent areas.

According to the second embodiment of this invention, a search with a high degree of freedom, for example, a search using search keys that consolidate pieces of information from various information sources, is thus accomplished by using as a search key at least one feature amount that is deduced from sighting information or other types of information, not just the feature amount of an actually taken image of a moving object to be searched for, and further setting arbitrary weights for the feature amounts.

Third Embodiment

The image search system 100 according to a third embodiment of this invention is described next. Components of the image search system 100 of the third embodiment have the same functions as those of the components of the first embodiment described with reference to FIG. 1 to FIG. 6 that are denoted by the same reference symbols, except for differences described below. Descriptions thereof are therefore omitted.

The database 111 of the third embodiment includes map information and coordinate conversion information, in addition to the information described in the first embodiment. The map information is of a space that contains the video taking ranges of cameras that have taken videos held in the video storage apparatus 101, or the video taking ranges of cameras that are equivalent to the video taking apparatus 102. For example, in the case where cameras are set up so as to take the interior of a building that has a plurality of floors, the map information may be three-dimensional map information of the building, floor plans of the respective floors, or any other form of map information.

The coordinate conversion information includes information for identifying, for each camera, a conversion parameter for conversion between coordinates on a frame image that is extracted from a video taken by the camera and coordinates on a map. The information included in the coordinate conversion information can be, for example, locations where the cameras are set up, and the video taking directions and field angles of the cameras. Based on the included information, the server computer 105 can calculate, for each camera, a conversion parameter for conversion between coordinates on an image taken by the camera and coordinates on a map, and use the calculated parameter for coordinate conversion. The coordinate conversion information may instead include the calculated conversion parameter itself.

Figure 12:
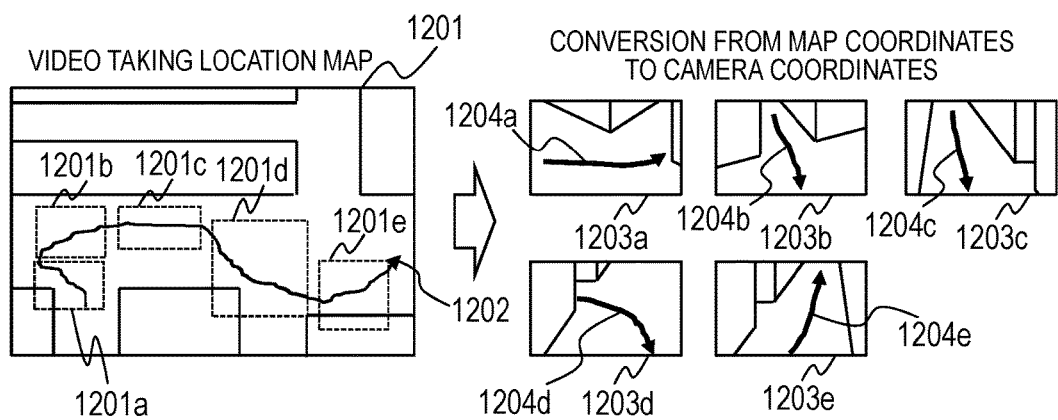
FIG. 12 is an explanatory diagram of a trajectory search using map information that is executed by an image search system according to a third embodiment of this invention.

FIG. 12 is an explanatory diagram of a trajectory search using map information that is executed by the image search system 100 according to the third embodiment of this invention.

The display apparatus 104 of the third embodiment displays in the video taking location display area 602 a map of an area that contains the search target video taking location (for example, a floor that includes the search target video taking location), instead of a background image of a video taking location specified by the user. A map 1201 of FIG. 12 is an example of the map that is displayed in the video taking location display area 602. Five cameras are set up as the video taking apparatus 102 on a floor illustrated in the map 1201. In the case where the coordinate conversion information includes information about locations where the cameras are set up and the like, the video taking ranges of the respective cameras on the map 1201 can be identified by cross-checking the map information against the coordinate conversion information. The video taking ranges of the five cameras are denoted by 1201a to 1201e in FIG. 12.

The user can enter a trajectory 1202 on the map 1201 by the same method that is used to enter the trajectory 606a of FIG. 6. The trajectory 1202 is a long trajectory running through the video taking ranges of a plurality of cameras. The trajectory feature converting module 113 receives from the trajectory input module 112 the coordinates of the entered trajectory 1202 on the map (in the example of FIG. 12, coordinates on a plan view), and converts the received coordinates into coordinates on images taken by the cameras (in the example of FIG. 12, coordinates on a screen showing a diagonal downward view). Specifically, for example, the trajectory feature converting module 113 cuts out portions of the entered trajectory 1202 that are included in the video taking ranges 1201a to 1201e of the cameras, and converts the coordinates of the cut-out portions into coordinates on images based on the coordinate conversion information. This conversion can be made by known methods.

Images 1203a to 1203e of FIG. 12 are images of the video taking ranges 1201a to 1201e, respectively, taken by the cameras. Trajectories 1204a to 1204e in the images 1203a to 1203e which are indicated by arrows are obtained by converting the coordinates on the map of the portions of the trajectory 1202 that are included in the respective video taking ranges into coordinates on the screen (that is, by mapping the trajectory 1202 onto camera images). For instance, an image of a person traveling along the trajectory 1202 moves along the trajectory 1204a on the image 1203a.

The trajectory feature converting module 113 converts, in Step S504 (FIG. 5), the trajectory (e.g., the trajectories 1204a to 1204e) that is obtained by the coordinate conversion described above into a trajectory feature amount. The similar vector searching module 114 conducts the same search as the one in the first embodiment, based on the trajectory feature amount obtained from the trajectory feature converting module 113, and outputs the results of the search.

The similar vector searching module 114 may display, in Step S506, as in the first embodiment, trajectories that are obtained as search results in the search result display area 604 of the display apparatus 104 as trajectories on camera images. Specifically, when a search is executed by using as search keys the plurality of trajectories 1204*a* to 1204*e* yielded from one long trajectory 1202 as illustrated in FIG. 12, trajectories similar to the trajectory 1204*a*, trajectories similar to the trajectory 1204*b*, trajectories similar to the trajectory 1204*c*, and trajectories similar to the trajectory 1204*d*, and trajectories similar to the trajectory 1204*e* are obtained as search results. The similar vector searching module 114 may display each of the trajectories obtained as the search results in the search result display area 604 as in the example of FIG. 6.

Alternatively, the similar vector searching module 114 may convert each trajectory on a camera image that is obtained as a search result into a trajectory on a map and display the resultant trajectory as described below with reference to FIG. 13. A plurality of trajectories on a map obtained by this conversion may be joined together to be displayed as one trajectory.

Figure 13:
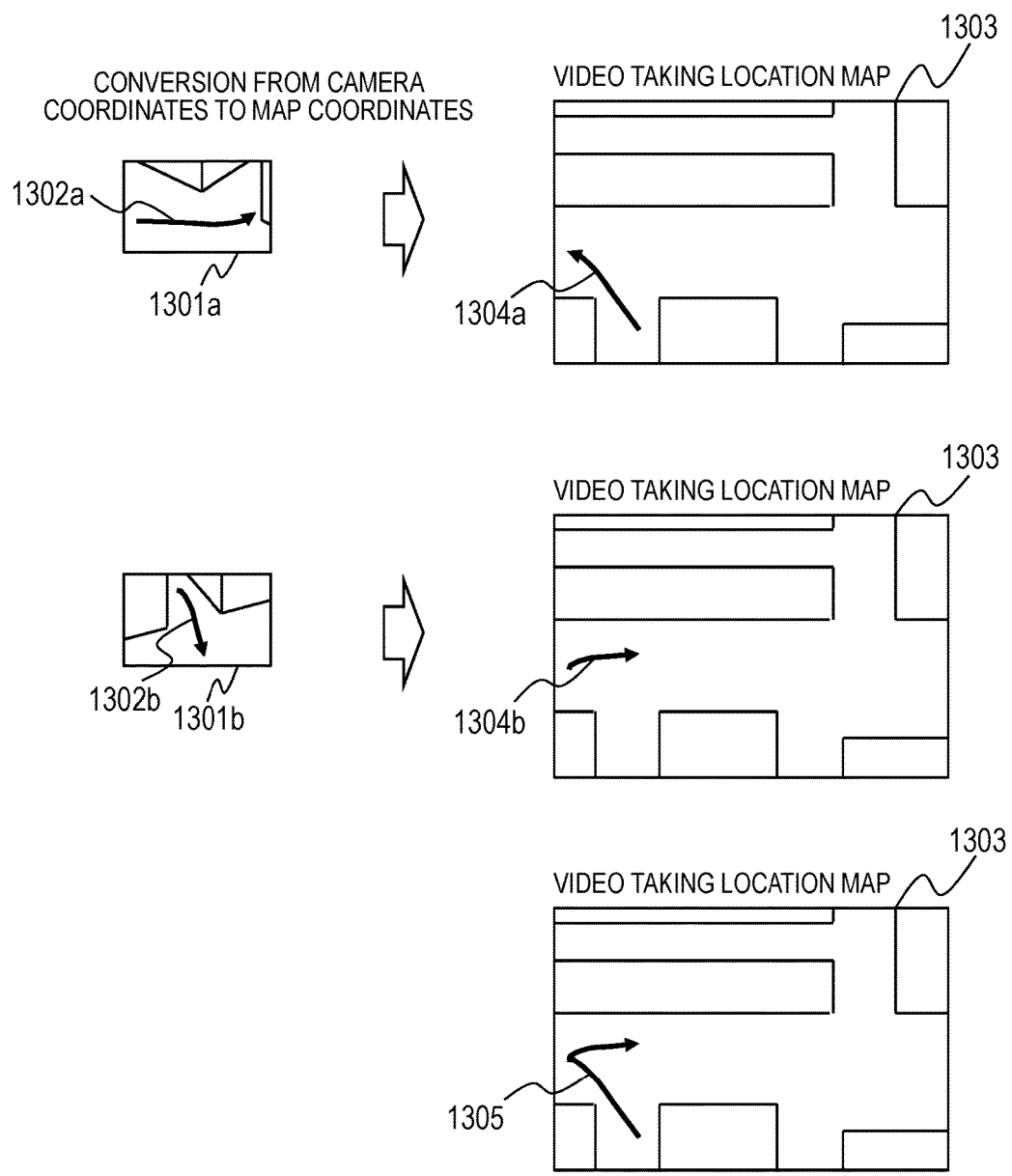
FIG. 13 is an explanatory diagram of conversion of coordinates on a camera image to coordinates on a map that is executed by the image search system according to the third embodiment of this invention.

FIG. 13 is an explanatory diagram of conversion of coordinates on a camera image to coordinates on a map that is executed by the image search system 100 according to the third embodiment of this invention.

A trajectory 1302*a* on an image 1301*a* is an example of trajectories that are obtained as results of the search in which the trajectory 1204*a* of FIG. 12 is used as a key. The similar vector searching module 114 may display the image 1301*a*, which includes the display of the trajectory 1302*a*, in the search result display area 604 as it is. The similar vector searching module 114 may instead generate a trajectory 1304*a* on a map 1303 from the trajectory 1302*a* on the camera image to display their images (namely, an image of the map 1303 on which an image of the trajectory 1304*a* is superimposed) in the search result display area 604. The similar vector searching module 114 can generate from the trajectory 1302*a* the trajectory 1304*a*, which is an image of the trajectory 1302*a* that is mapped onto the map 1303, by executing coordinate conversion that is reverse to the conversion executed by the trajectory feature converting module 113.

The similar vector searching module 114 may output a moving object image that is associated with the found trajectory 1031*a* as in the first embodiment. In this case, the display apparatus 104 may display the moving object image superimposed on the trajectory 1304*a*. Alternatively, the display apparatus 104 may display only a trajectory that is obtained by conversion on the map 1303, while separately displaying a camera image of a moving object that is associated with a movement trajectory found by a search.

When a trajectory 1302*b* on an image 1301*b*, for example, is obtained as a search result through the same processing, the similar vector searching module 114 may convert the trajectory 1302*b* into a trajectory 1304*b* on the map 1303 to display the trajectory 1304*b* superimposed on the map 1303 in the search result display area 604.

When the trajectories 1304*a* and 1304*b* fulfill a given condition, the similar vector searching module 114 may generate one trajectory 1305 by joining the trajectories 1304*a* and 1304*b* together, to display the trajectory 1305 superimposed on the map 1303 in the search result display area 604.

Specifically, a traveling speed is calculated from a length of time between the end date/time of the trajectory 1302*a* and the start date/time of the trajectory 1302*b* that are held in the trajectory feature amount management information 320, and from a distance between the coordinates of the end point of the trajectory 1304*a* and the coordinates of the end point of the trajectory 1304*b*. When the calculated traveling speed is within a range that is deemed as physically possible and feature amounts of images associated with the trajectories are similar to each other, the trajectories 1304*a* and 1304*b* are determined as a continuous trajectory of the same person, and can be joined together. In order to make this determination, the video database 111 of the third embodiment may include the same information as the facial feature amount management information 830, the head feature amount management information 840, and the clothing feature amount management information 850, which are described in the second embodiment.

The similar vector searching module 114 further joins other trajectories the same way, thereby displaying a long trajectory similar to the trajectory 1202 on the map in the search result display area 604.

The display of search results described with reference to FIG. 13 may be executed independently of the trajectory entering described with reference to FIG. 12. For example, a trajectory that is the result of a search may be displayed as illustrated in FIG. 13 when the user enters a trajectory by the same method that is used in the first embodiment and a trajectory similar to the entered trajectory is obtained as a search result.

According to the third embodiment of this invention described above, the trajectory of a moving object that is drawn on a map can be entered to search for a trajectory on a camera image that is similar to the trajectory on the map and, in addition, the result of the search can be displayed as a trajectory drawn on a map. This makes it easy for the user to enter a trajectory that is identified from other information sources than a video taken with a camera (for example, sighting information), and to grasp a trajectory obtained as a search result.

Fourth Embodiment

The image search system 100 according to a fourth embodiment of this invention is described next. Components of the image search system 100 of the fourth embodiment have the same functions as those of the components of the first embodiment described with reference to FIG. 1 to FIG. 6 that are denoted by the same reference symbols, except for differences described below. Descriptions thereof are therefore omitted.

Figure 14:
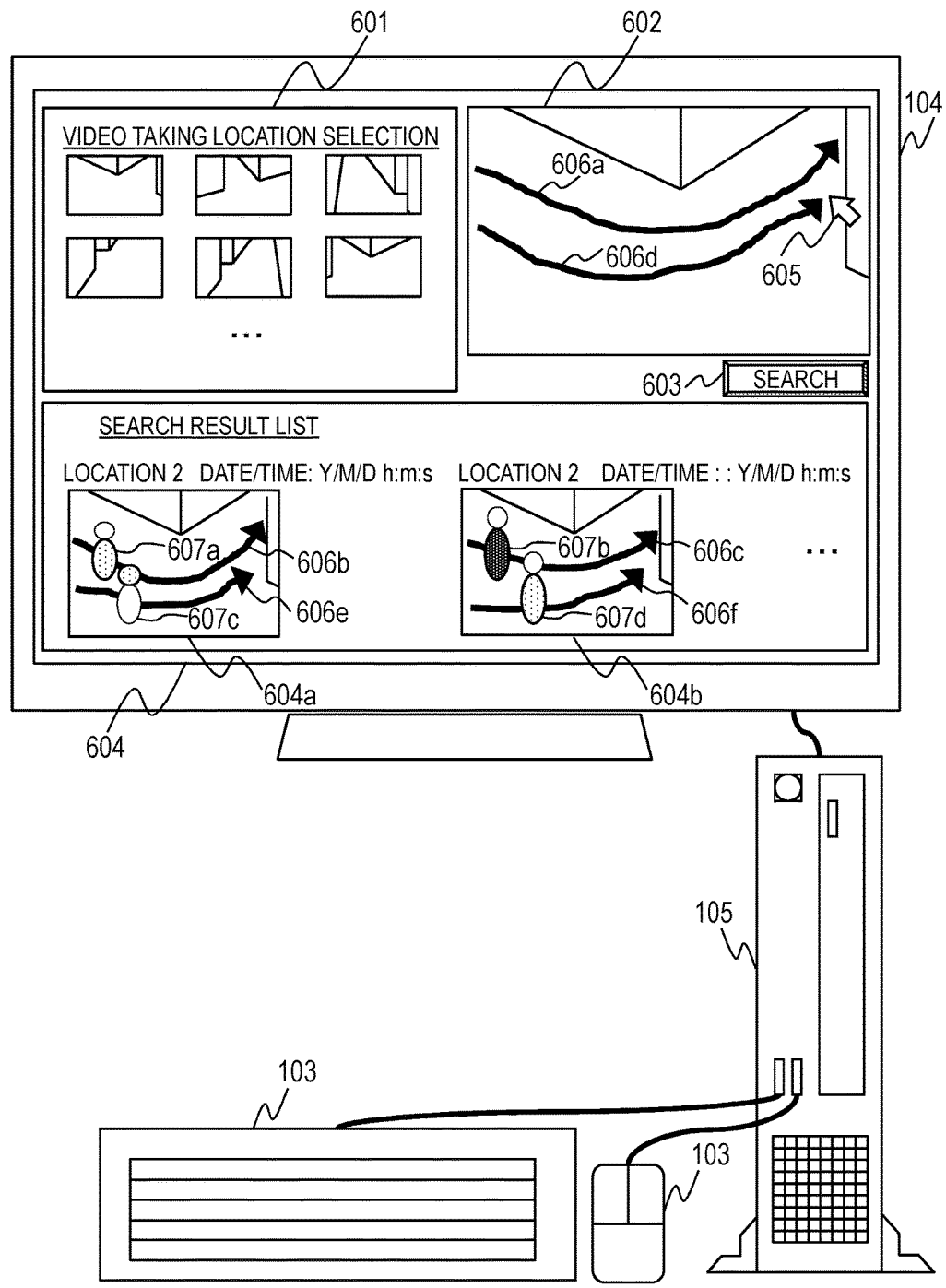
FIG. 14 is an explanatory diagram of a search screen that is output by a server computer according to a fourth embodiment of this invention.

FIG. 14 is an explanatory diagram of a search screen that is output by the server computer 105 according to the fourth embodiment of this invention.

In the fourth embodiment, the user can enter trajectories of a plurality of moving objects that serve as search keys by operating the input apparatus 103. For example, when the display apparatus 104 is a touch panel to double as the input apparatus 103, the user may enter trajectories 606*a* and 606*d* simultaneously by swiping two instruction means (e.g., two fingers or two styluses). The trajectory input module 112 treats the two trajectories entered simultaneously in this manner as one group. Alternatively, the user may enter the trajectories 606*a* and 606*d* sequentially by using one instruction means, or by moving the pointer 605 with a mouse that is the input apparatus 103, and then enter information for specifying that the trajectories 606*a* and 606*d* make up one group. The trajectory input module 112 treats the two trajectories specified in this manner as one group.

The trajectory feature converting module 113 separately converts each of the two trajectories that are included in one group into a trajectory feature amount, and the similar vector searching module 114 searches for a group similar to the group of two trajectories. Specifically, the similar vector searching module 114 may, for example, conduct the search based on the trajectory feature amounts to search for a trajectory that is similar in shape to the trajectory 606a and to further search for a trajectory that is similar in shape to the trajectory 606d. In the case where a trajectory 606b similar in shape to the trajectory 606a and a trajectory 606e similar in shape to the trajectory 606d are found, for example, the similar vector searching module 114 may calculate a score for the degree of similarity between the group made up of the trajectories 606a and 606d and a group made up of the trajectories 606b and 606e, based on the degree of similarity in shape between the trajectory 606a and the trajectory 606b, the degree of similarity in shape between the trajectory 606d and the trajectory 606e, and the degree of similarity in start date/time and end date/time between the trajectory 606b and the trajectory 606e.

In the same manner, the similar vector searching module 114 may also calculate similarity degree scores for other found trajectory groups to display search results in the order of scores in the search result display area 604. In the example of FIG. 14, the image 604a that includes the trajectories 606b and 606e and the image 604b that includes trajectories 606c and 606f are displayed. Images of moving objects 607a, 607b, 607c, and 607d that are associated with the trajectories 606b, 606c, 606e, and 606f, respectively, may additionally be displayed.

The server computer 105 of the first embodiment may use the same method that is described above to receive an input of three or more trajectories and to search for a trajectory group similar to the group of entered trajectories. The user may enter one trajectory, for example, 606a, and then enter information indicating that the trajectory 606a is a trajectory of a group that includes a plurality of moving objects. For instance, the user may enter the trajectory 606a as a trajectory group by entering a given graphic symbol that indicates a group, e.g., a circle, at the start point of the trajectory 606a and moving the graphic symbol along the shape of trajectory 606a. The user at this point may further enter information for specifying the number of trajectories that are included in the trajectory group.

When the trajectory group is entered in this manner, the similar vector searching module 114 uses, for example, the same method that is described above to search for a group of the specified number of trajectories that are similar to the trajectory 606a in shape, start date/time, and end date/time, and to output the result of the search.

Trajectories of a plurality of moving objects may be specified in the second embodiment of this invention in the manner described above. The user in this case may further specify at least one image feature amount (e.g., a facial feature amount) of the plurality of moving objects. Then, the similar vector searching module 732 executes, in addition to the same search that is conducted by the similar vector searching module 114, a search based on the same image feature amounts that are used in the second embodiment. The search result integrating module 733 integrates the results of the searches and outputs the integrated results.

According to the fourth embodiment described above, a group of a plurality of moving objects can also be searched for with ease.

This invention is not limited to the embodiments described above, and encompasses various modification examples. For example, the embodiments have described this invention in detail for the ease of understanding, and this invention is not necessarily limited to a mode that includes all of the configurations described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

The components, functions, processing modules, processing means, and the like described above may be implemented partially or entirely by hardware by, for example, designing the components and the like as an integrated circuit. The components, functions, and the like described above may also be implemented by software by interpreting and executing, with a processor, programs that implement the respective functions. The programs, tables, files, and other types of information for implementing the functions can be stored in a computer-readable non-transitory data storage medium, e.g., memory, or a hard disk drive, a solid state drive (SSD), or other storage device, or an IC card, an SD card, a DVD, or the like.

Control lines and information lines considered to be necessary for describing the embodiments are illustrated in the drawings, and all control lines and information lines included in an actual product to which this invention is applied are not always illustrated. It may also be considered that almost all components are actually mutually coupled to each other.

What is claimed is:

1. An image search system, comprising:
a processor; and
a storage device coupled to the processor, and configured to hold one or more videos, information indicating shapes of trajectories that represent travel paths of a plurality of moving objects extracted from the one or more videos, and information indicating image feature amounts of image areas of a plurality of types that are extracted from the one or more videos,
wherein the processor is configured to:
search, when information indicating a trajectory shape is input, the trajectories of the plurality of moving objects that are held in the storage device for trajectories that are similar to the input trajectory shape;
calculate, when information indicating an image feature amount of at least one type of image area, and information indicating weights of a feature amount of the input trajectory shape and each image feature amount of the at least one type of image area are input, similarity degree scores based on degrees of similarity between the input trajectory shape and the shapes of the trajectories of the plurality of moving objects that are held in the storage device, degrees of similarity between the input image feature amount of the at least one type of image area and the image feature amounts held in the storage device, and the input weights; and
output images from the one or more videos of the moving objects that have traveled along the trajectories found through the search in an order of the calculated similarity degree scores.

2. The image search system according to claim 1, further comprising:
a camera configured to capture the one or more videos.

3. The image search system according to claim 1, further comprising:
a camera configured to capture the one or more videos; and
a display apparatus connected to the processor,
wherein the processor is further configured to:
display the output images from the one or more videos of the moving objects that have traveled along the trajectories found through the search in the order of the calculated similarity degree scores on the display apparatus.

4. The image search system according to claim 1, wherein the processor is further configured to:
   extract the information indicating shapes of trajectories that represent travel paths of the plurality of moving objects and the information indicating image feature amounts of image areas of the plurality of types from the one or more videos.

5. An image search system, comprising:
   a processor; and
   a storage device coupled to the processor, and configured to hold one or more videos, information indicating shapes of trajectories that represent travel paths of a plurality of moving objects extracted from the one or more videos, map information of a space corresponding to the one or more videos, and conversion information for identifying one or more conversion parameters for conversion between coordinates of a map of the space and coordinates of the one or more videos,
   wherein the processor is configured to:
      output a map of the space;
      convert, when information indicating a trajectory shape on the map of the space is input, the input trajectory shape into a trajectory shape on the one or more videos that are held in the storage device based on the conversion information;
      search the trajectories of the plurality of moving objects that are held in the storage device for trajectories that are similar to the trajectory shape created by the conversion; and
      output images from the one or more videos of the moving objects that have traveled along the trajectories found through the search.

6. The image search system according to claim 5, further comprising:
   a camera configured to capture the one or more videos.

7. The image search system according to claim 5, further comprising:
   a camera configured to capture the one or more videos; and
   a display apparatus connected to the processor,
   wherein the processor is further configured to:
      display the output images from the one or more videos of the moving objects that have traveled along the trajectories found through the search on the display apparatus.

8. The image search system according to claim 5, wherein the processor is further configured to:
   extract the information indicating shapes of trajectories that represent travel paths of the plurality of moving objects from the one or more videos.

9. An image search system, comprising:
   a processor; and
   a storage device coupled to the processor, and configured to hold one or more videos, information indicating shapes of trajectories that represent travel paths of a plurality of moving objects extracted from the one or more videos, map information of a space corresponding to the one or more videos, and conversion information for identifying one or more conversion parameters for conversion between coordinates of a map of the space and coordinates of the one or more videos,
   wherein, when information indicating a trajectory shape is input, the processor is configured to:
      search, the trajectories of the plurality of moving objects that are held in the storage device for trajectories that are similar to the input trajectory shape;
      convert the trajectory shapes found through the search into trajectory shapes on the map of the space based on the conversion information; and
      output information indicating the map of the space and the trajectory shapes created by the conversion; and
      output images from the one or more videos of the moving objects that have traveled along the trajectories found through the search.

10. The image search system according to claim 9, further comprising:
    a camera configured to capture the one or more videos.

11. The image search system according to claim 9, further comprising:
    a camera configured to capture the one or more videos; and
    a display apparatus connected to the processor,
    wherein the processor is further configured to:
       display the output images from the one or more videos of the moving objects that have traveled along the trajectories found through the search on the display apparatus.

12. The image search system according to claim 9, wherein the processor is further configured to:
    extract the information indicating shapes of trajectories that represent travel paths of the plurality of moving objects from the one or more videos.

* * * * *